United States Patent
Ng et al.

(10) Patent No.: US 11,315,526 B2
(45) Date of Patent: Apr. 26, 2022

(54) TRANSPORTATION HUB INFORMATION SYSTEM

(71) Applicant: Misapplied Sciences, Inc., Redmond, WA (US)

(72) Inventors: Albert Han Ng, Pasadena, CA (US); David Steven Thompson, Redmond, WA (US); David Randall Bonds, Chatsworth, GA (US); Ayon Sen, Pasadena, CA (US)

(73) Assignee: Misapplied Sciences, Inc., Redmond, WA (US)

( * ) Notice: Subject to any disclaimer, the term of this patent is extended or adjusted under 35 U.S.C. 154(b) by 0 days.

(21) Appl. No.: 17/142,948

(22) Filed: Jan. 6, 2021

(65) Prior Publication Data

US 2021/0210053 A1    Jul. 8, 2021

Related U.S. Application Data

(60) Provisional application No. 62/957,656, filed on Jan. 6, 2020.

(51) Int. Cl.
*G09G 5/14* (2006.01)
*G06Q 50/30* (2012.01)
*G06V 40/70* (2022.01)

(52) U.S. Cl.
CPC ............... *G09G 5/14* (2013.01); *G06Q 50/30* (2013.01); *G06V 40/70* (2022.01); *G09G 2320/068* (2013.01); *G09G 2320/0626* (2013.01); *G09G 2320/0666* (2013.01); *G09G 2354/00* (2013.01)

(58) Field of Classification Search
None
See application file for complete search history.

(56) References Cited

U.S. PATENT DOCUMENTS

| 10,269,279 | B2 | 4/2019 | Ng et al. |
| 2010/0281364 | A1 | 11/2010 | Sidman |
| 2016/0364087 | A1* | 12/2016 | Thompson ............ G06F 3/0481 |

(Continued)

FOREIGN PATENT DOCUMENTS

WO    2015/069320 A2    5/2015

OTHER PUBLICATIONS

International Search Report dated Mar. 25, 2021, for the corresponding International Patent Application No. PCT/US2021/012348, 10 pages.

*Primary Examiner* — Aneeta Yodichkas
(74) *Attorney, Agent, or Firm* — Seed IP Law Group LLP

(57) ABSTRACT

A multi-view (MV) transportation hub information system is provided, which includes: a MV display including one or more multi-view (MV) pixels, wherein each MV pixel is configured to emit beamlets in different directions; a sensing system configured to detect a first location of a first blob and a second location of a second blob; an input node configured to receive a first attribute of a first viewer and a second attribute of a second viewer; and a system controller configured to perform user tagging to tag the first blob with the first attribute and to tag the second blob with the second attribute. The system controller controls the MV pixels to project a first image based on the first attribute to the first viewer tagged with the first blob, and to project a second image based on the second attribute to the second viewer tagged with the second blob.

23 Claims, 11 Drawing Sheets

(56) References Cited

U.S. PATENT DOCUMENTS

2018/0277032 A1\* 9/2018 Ng .................... G09G 3/025
2018/0357981 A1 12/2018 Ng et al.
2018/0373959 A1 12/2018 Rhoads et al.

\* cited by examiner

TRANSPORTATION HUB INFORMATION SYSTEM

BACKGROUND

Technical Field

This disclosure relates to a personalized content delivery system and method, which are particularly suited for implementation in a transportation hub such as an airport, and which are capable of producing different, individualized messages (e.g., transportation information) directed to different viewers (e.g., travelers) present at multiple viewing zones throughout the transportation hub.

Description of the Related Art

Transportation hubs, such as airports, cruise ship ports, and train stations, typically serve many guests at a time, with each guest having their own travel itinerary and personal preferences. To provide the relevant travel information to all guests, the information signage around a hub is often filled with much more information than an individual guest would need. As examples, flight information displays often list all departure flights, baggage information displays list the flight assignment for all baggage claims, and gate information displays show information for all boarding priority classes. Furthermore, particularly in international hubs, the content on the signage often rotates between multiple languages. This excess of information is often necessary to ensure all guests receive the information they need, but makes the travel experience cumbersome by requiring the guests to search for their relevant information. In addition, the requirement to provide a burdensome amount of logistical information limits the opportunity to address the emotional needs of travelers, whose journey might be enhanced with targeted entertainment content, and with personalized messages from family, friends, colleagues, fellow travelers, destinations, businesses, transportation providers, and service providers. Therefore, it would be useful to have a transportation hub information system that can deliver different, individualized messages to different guests simultaneously.

BRIEF SUMMARY

According to an exemplary embodiment, a multi-view (MV) transportation hub information system is provided, which includes:

a multi-view (MV) display including one or more multi-view (MV) pixels, wherein each MV pixel is configured to emit beamlets in different directions in one or more beamlet coordinate systems;

a sensing system which, in operation, detects a first location of a first blob and a second location of a second blob;

an input node which, in operation, receives a first attribute of a first viewer and a second attribute of a second viewer; and a system controller, coupled to the MV display, the sensing system, and the input node, which, in operation, performs user tagging to tag the first blob with the first attribute and to tag the second blob with the second attribute;

defines, in a viewing zone coordinate system, a first viewing zone based on the first blob and a second viewing zone based on the second blob;

determines a mapping that translates between the viewing zone coordinate system and the one or more beamlet coordinate systems;

associates a first information content with the first viewing zone based at least on the first attribute and associates a second information content with the second viewing zone based at least on the second attribute;

for a first image generated from the first information content, using the mapping, identifies a bundle of beamlets from the one or more MV pixels of the MV display directed to the first viewing zone to form the first image;

for a second image generated from the second information content, using the mapping, identifies a bundle of beamlets from the one or more MV pixels of the MV display directed to the second viewing zone to form the second image, wherein the bundle of beamlets directed to the first viewing zone to form the first image visible to the first viewer is different from the bundle of beamlets directed to the second viewing zone to form the second image visible to the second viewer; and outputs control signaling for the MV pixels, the control signaling defining color and brightness of each of the beamlets in each bundle to project the corresponding first or second image to the corresponding first or second viewing zone.

According to another aspect, the sensing system comprises a camera.

According to another aspect, the first or second information content includes one or more of: transportation information, gate location, wayfinding direction, boarding time, travel update notification, advertisement, arrival message, departure message, baggage claim information, language translation, accessibility information, personal messaging from individuals, location of services, emergency/evacuation notifications, brand messaging, entertainment content, group coordination information, graphical/pictorial/photographic content, video content, and image capture.

According to another aspect, the sensing system detects the first blob in a registration region defined in the viewing zone coordinate system, and the system controller performs user tagging by tagging the first blob in the registration region with the first attribute and tracking movement of the first blob from the registration region.

According to another aspect, the MV transportation hub information system includes a ticket scanner which, in operation, detects the first attribute.

According to another aspect, the MV transportation hub information system includes a user-interface device which, in operation, receives a viewer specification of the first attribute.

According to another aspect, the user-interface device comprises a stationary kiosk.

According to another aspect, the user-interface device comprises a smartphone or a mobile computing device of the first viewer.

According to another aspect, a location of the user-interface device is estimated using a localization system in a device coordinate system.

According to another aspect, the system controller determines a mapping between the device coordinate system and one or more of the viewing zone coordinate system or the beamlet coordinate systems.

According to another aspect, the user tagging is performed by associating the user-interface device with the first blob, using the location of the user-interface device and the location of the first blob, by one or more of a nearest-neighbor matching technique, a dynamic time warping technique, a combinatorial optimization technique, or a classifier trained using a machine learning algorithm.

According to another aspect, the localization system estimates the location of the user-interface device using one or more of Wi-Fi triangulation, ultra-wideband triangulation, Bluetooth time-of-flight, Bluetooth signal strength, Bluetooth angle-of-arrival, or ultrasound techniques.

According to another aspect, the MV transportation hub information system includes a biometric scanner which, in operation, detects the first attribute.

According to another aspect, the biometric scanner comprises a facial recognition system, a fingerprint scanner, a retinal scanner, or an iris recognition system.

According to another aspect, the first blob associated with the first viewer is updated as the first viewer moves.

According to another aspect, the system controller detects that the first image may be visible to the second viewer.

According to another aspect, the system controller associates a third information content with both the first viewer and the second viewer.

According to another aspect, the third information content compromises one or more of: a generic content, instructional content, or content in a shared language.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

In the following description, for purposes of explanation, numerous specific details are set forth in order to provide a thorough understanding of the present invention. It will be evident, however, to one skilled in the art, that the present invention may be practiced without these specific details. In other instances, well-known circuits, structures, and techniques are not shown in detail, but rather in a block diagram, in order to avoid unnecessarily obscuring an understanding of this description. Thus, the specific details set forth are merely exemplary. Particular implementations may vary from these exemplary details and still be contemplated to be within the scope of the present invention. Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

The disclosed invention is a transportation hub information system comprising multi-view (MV) displays that send different content to multiple viewers at the same time.

MV displays comprise MV pixels, each of which can emit different colored light in different directions. These individually controllable units of light, or beamlets, allow multiple viewers to simultaneously perceive different messages or content on the same shared display. The beamlets of a MV pixel can be defined using a beamlet coordinate system, and multiple beamlet coordinate systems may be configured for multiple MV pixels, respectively.

Figure 1A:
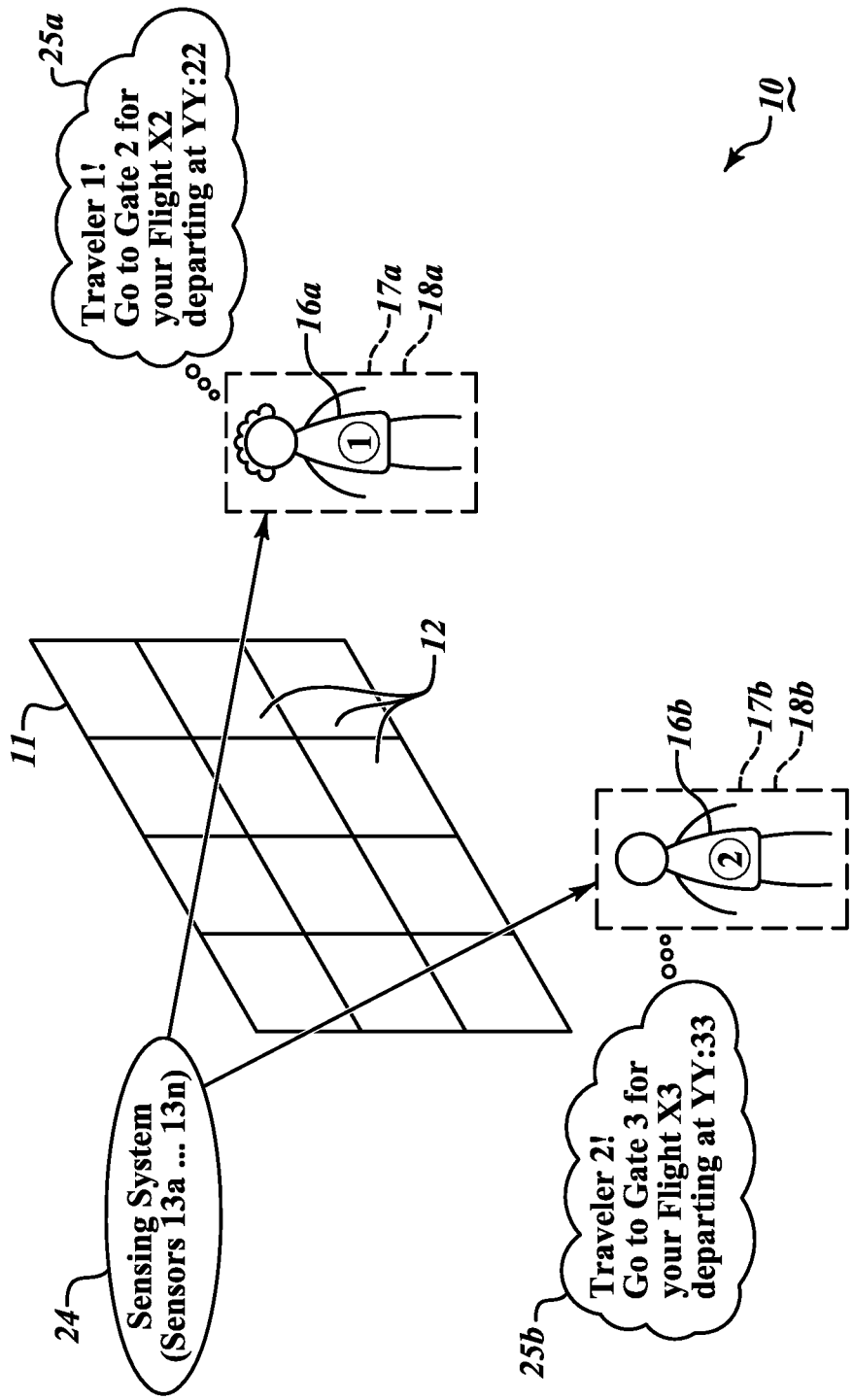
FIG. 1A depicts an embodiment of a multi-view (MV) transportation hub information system.

FIG. 1A is a diagram depicting one implementation example of a multi-view (MV) transportation hub information system 10, suitable for use in transportation hubs such as airports, cruise ship ports, and train stations. The MV transportation hub information system can present different messages or images to different travelers standing or moving in different viewing zones relative to a MV display, to allow different travelers to receive different and customized transportation information simultaneously, such as gate location, wayfinding direction and boarding time. Thus, each traveler does not have to sift through a vast amount of information, most of which is directed to other travelers and is therefore irrelevant.

In FIG. 1A, the MV transportation hub information system 10 includes at least one multi-view (MV) display 11 composed of one or more MV pixels 12, wherein each MV pixel 12 is configured to emit beamlets (individually controllable beams) in different directions in a beamlet coordinate system (see FIG. 8), wherein multiple beamlet coordinate systems may be configured for multiple MV pixels, respectively. The MV transportation hub information system 10 includes a sensing system 24 (including sensors 13a . . . 13n) which, in operation, detects a first blob 17a and a second blob 17b, which may be any human-shaped objects imaged or otherwise sensed by the sensing system 24. As used herein, a blob is a target object which can be detected and tracked by the sensing system 24 but its identity is not yet known. For example, a blob can be a human-shaped object representing a person (a traveler) whose identity is not yet known. In some exemplary embodiments, the sensing system 24 finds a blob in a viewing zone coordinate system defined by the sensing system 24 (e.g., camera), while a mobile device localization system (e.g., Bluetooth) finds a location of a traveler surrogate device, such as the traveler's smartphone in a mobile device coordinate system. A mapping between the viewing zone coordinate system and the mobile device coordinate system may be determined through calibration, so that the MV transportation hub information system 10 can determine which viewer blob is holding which mobile device (via nearest neighbor matching, combinatorial optimization, dynamic time warping, etc.) According to various embodiments, the MV transportation hub information system 10 performs "user tagging" to label (tag) those sensed blobs 17a and 17b with attributes of particular (identified) travelers 16a and 16b, respectively, as will be more fully described below.

The sensors 13a-13n of the sensing system 24 may include one or more cameras, which can image human-shaped blobs. Alternatively or additionally, the sensing system 24 may include a positioning system which determines the location of a viewer surrogate device, such as a smartphone or another mobile computing device, using any known positioning techniques or systems such as the global positioning system (GPS), mobile phone tracking techniques based on multilateration of mobile radio signals, RFID or other tagging systems, etc.

In general, the sensing system 24 can be used to estimate locations of viewers (travelers) in the viewing environment of the MV transportation hub information system 10. Example sensing systems that can achieve this include but are not limited to 2D camera systems, depth sensing systems, motion tracking systems, wearable device tracking systems, and mobile device tracking systems. The sensing system can estimate the locations of viewers in a viewing zone coordinate system, and viewing zones of the viewers can be defined in the viewing zone coordinate system based on the estimated locations of viewers. As examples, viewing zones can be established to encompass viewers' outlines, viewers' heads, or viewers' eyes. The sensing system 24 can detect and track viewers as anonymous blobs, without resolving to identity of each viewer.

Figure 3:
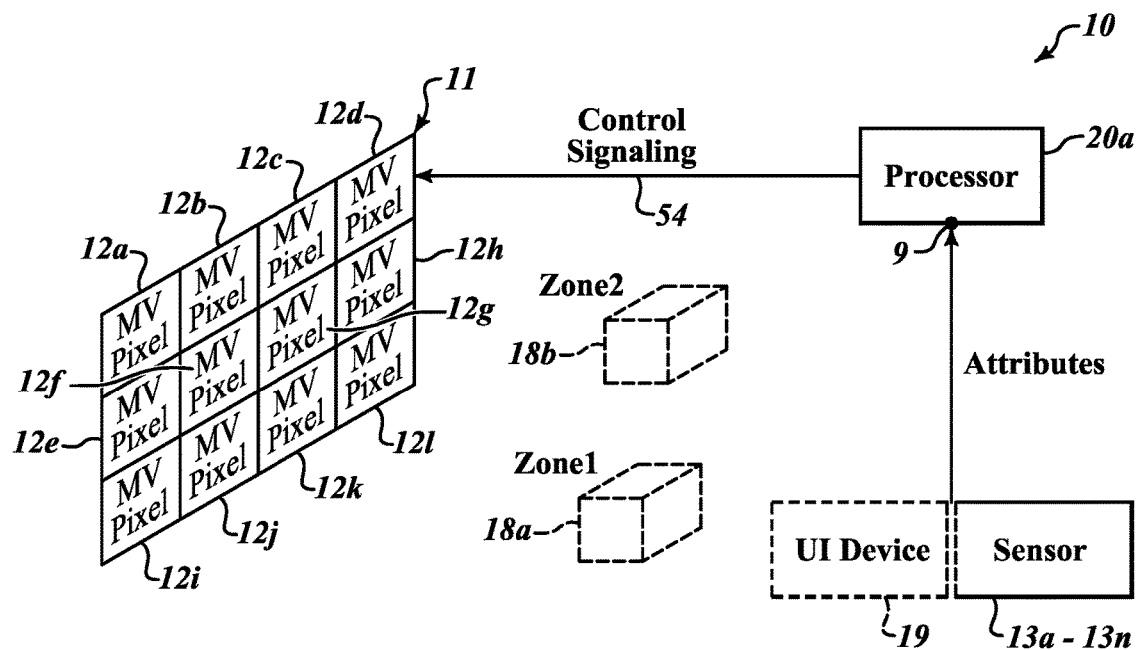
FIG. 3 depicts an embodiment of a multi-view display coupled to a processor.

Referring additionally to FIG. 3, the MV transportation hub information system 10 also includes an input node 9 configured to receive a first attribute of the first traveler 16a (or the "first viewer 16a" as interchangeably used) and a second attribute of the second traveler 16b (or the "second viewer 16b" as interchangeably used). As will be more fully described below, the first and second attributes may be any characteristics associated with, or indicative of, the travelers 16a/16b, such as the presence or location of the travelers 16a/16b, the traveler's identity, behavior, travel itinerary, or travel history. In various embodiments, one or more of the sensors 13a-13n of the sensing system 24 may be coupled, in a wired or wireless manner, to the input node 9, such that the sensors 13 can detect the first attribute and the second attribute and transmit them to the input node 9. For example, the sensor 13a in FIG. 1A may be used to detect the presence (the first attribute) of the first traveler 16a and the presence (the second attribute) of the second traveler 16b, and provide the first and second attributes to the input node 9.

In some embodiments, the sensing system 24 may include a ticket scanner 13d (see FIG. 7A) configured to read a ticket 21, such as a boarding pass, of the first traveler 16a to detect the first attribute of the first traveler 16b and provide the detected first attribute to the input node 9. In some embodiments, the sensing system 24 is not necessarily used to provide the first and second attributes to the input node 9. Rather, the first and second attributes (e.g., the identity of each traveler) may be entered (e.g., manually) by the traveler 16a or 16b via a suitable user-interface (UI) device 19 such as a keypad, though in those cases the UI device 19 may be considered to be one of the sensors 13a-13n constituting the sensing system 24. The UI device 19 may be, without limitation, a keyboard or keypad on which the traveler may type indications of attributes (e.g., itinerary numbers, traveler's identity); a microphone into which the traveler may speak indications of attributes; a touch/gesture-sensitive pad on which the traveler may tap/gesture indications of attributes; an optical pointer the traveler may use to express indications of attributes, etc.

Figure 7A:
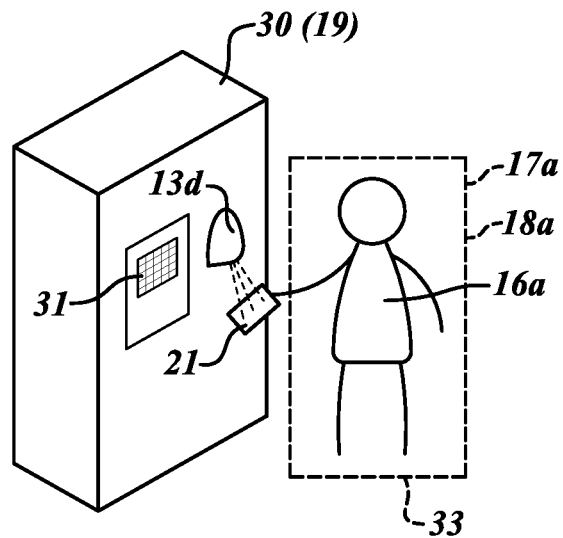
FIG. 7A depicts a sample registration region, defined near a transportation check in counter for example, where a traveler's ticket is read, to facilitate user tagging including determining the traveler's identity ("an attribute") and labeling (tagging) a "blob" sensed in the registration region as the identified traveler.

In FIG. 1A, the sensing system 24 including one or more sensors 13a-13c, such as cameras, is used to locate and track the first and second travelers 16a and 16b, respectively labeled ① and ②, at a transportation hub where one or more MV displays 11 and one or more sensors 13a-13n are arranged. The sensors 13a-13n may be used to detect, sense, or collect not only the first and second attributes but any data useful to the MV transportation hub information system 10. For example, as described above, the sensing system 24 allows for the MV transportation hub information system 10 to detect, identify, select, locate, or track the first and second blobs 17a and 17b, the travelers 16a and 16b, or traveler surrogate devices such as phones, other mobile computing devices, and radio tags. The sensing system 24 further allows for the MV transportation hub information system 10 to locate, arrange, or update viewing zones respectively associated with the travelers 16a and 16b, as will be more fully described below. The sensing system 24 also allows for the MV transportation hub information system 10 to monitor, detect, or measure attributes or variables, not limited to traveler attributes such as traveler behaviors (e.g., a path of travel in a transportation hub), but directed to environmental conditions (e.g., traveler congestion level, lighting condition, temperature at the transportation hub), timing conditions, transportation schedules, etc. The sensing system 24 is further capable of receiving traveler input via a traveler surrogate device (e.g., via the traveler's smartphone) or a suitable UI device 19, such as the stationary kiosk 30 (FIG. 7A). For example, the sensors 13a-13n may evaluate lighting, distance from the MV display 11 to the traveler 16a/16b, and other criteria, which may be used by the MV transportation hub information system 10 to adjust traveler related content, from which an image containing a message to the traveler is generated, for enhanced image visibility or readability to the intended viewer/traveler. The sensing system 24 may acquire data that can be analyzed and used to pre-program, schedule, or adjust various versions of travel related content and the layout of viewing zones.

In FIG. 1A, a system controller 20 (see FIG. 2) of the MV transportation hub information system 10, which is coupled to the MV display 11 and the input node 9, performs user tagging, which tags the first blob 17a detected by the sensing system 24 with a first attribute of the first viewer (first traveler) 16a and tags the second blob 17b detected by the sensing system 24 with a second attribute of the second viewer (second traveler) 16b. For example, the first and second viewers' mobile devices may be used to indicate the first and second attributes of the first and second viewers, to be tagged with the first and second blobs, as will be more fully described below. User tagging is one of the important technical features of the present disclosure, in that accurately tagging different blobs detected by the sensing system 24 to different travelers, respectively, facilitates generating and delivering personalized travel information to each traveler. Various methods of user tagging will be described below.

Figure 8:
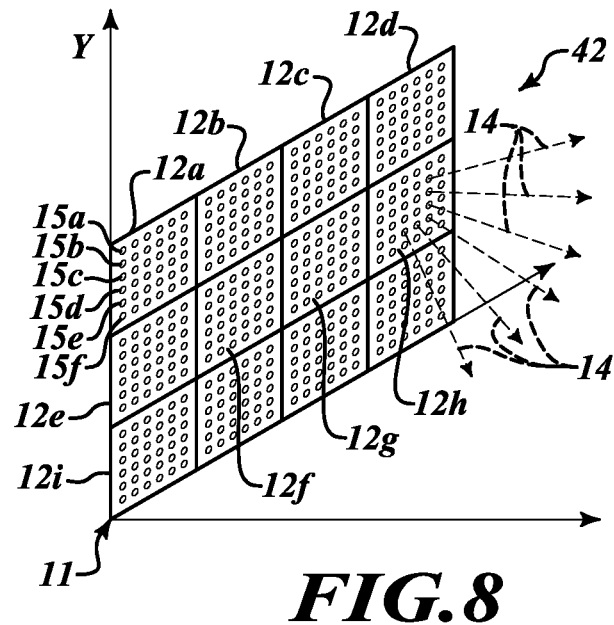
FIG. 8 depicts a beamlet coordinate system according to an embodiment.

The system controller 20 defines the first viewing zone 18a relative to the MV display 11 in a viewing zone coordinate system (FIG. 5), based on the first blob 17a or the first traveler 16a, and defines the second viewing zone 18b relative to the MV display 11 in the viewing zone coordinate system based on the second blob 17b or the second traveler 16b. For example, the first and second viewing zones 18a and 18b may be defined to generally enclose the first and second blobs/travelers 17a/16a and 17b/16b, respectively. The system controller 20 determines a mapping that translates between the viewing zone coordinate system and the one or more beamlet coordinate systems (see FIG. 8). Specifically, for the MV display 11 to controllably send selected, personalized content to each individual viewer in the viewing environment, the system controller 20 determine a mapping between the viewing zone coordinate system (FIG. 5) and beamlet coordinate systems of the MV pixels (FIG. 8). For example, this mapping can be generated using a calibration procedure while the MV display 11 is being installed, and stored in memory to be looked up during operation. Using this mapping, the system controller 20 can then set the color and brightness of each of the beamlets of the MV pixels to send a particular image to a designated viewing zone, as will be more fully described below.

Referring back to FIG. 1A, the system controller 20 associates first information content (or "first travel related content") with the first viewing zone 18a based at least on the first attribute of the first traveler 16a, and associates second information content (or "second travel related content") with the second viewing zone 18b based at least on the second attribute of the second traveler 16b. The system controller 20 controls the MV display 11 to show a first image 25a generated from the first travel related content to the first traveler 16a at the first viewing zone 18a, and to show a second image 25b generated from the second travel related content to the second traveler 16b at the second viewing zone 18b. In the illustrated example, the first image 25a visible to the first traveler 16a reads "TRAVELER 1! Go to Gate 2 for your Flight X2 departing at YY:22" and the second image 25b visible to the second traveler 16b reads "TRAVELER 2! Go to Gate 3 for your Flight X3 departing at YY:33." The first travel related content, from which the first image 25a is created, is personalized for the first traveler 16a, and the second travel related content, from which the second image 25b is created, is personalized for the second traveler 16b. The first or second information content may include, as non-limiting examples, one or more of: transportation information, gate location, wayfinding direction, boarding time, travel update notification, advertisement, arrival message, departure message, baggage claim information, language translation, accessibility information, personal messaging from individuals (such as fellow travelers, people meeting traveler, and so forth), location of services, emergency/evacuation notifications, brand messaging, entertainment content, group coordination information, graphical/pictorial/photographic content, video content, and image capture (e.g., photographs or video captured of the individual—possibly during their journey—and played back to them).

As for the personal messaging from individuals, referring to FIG. 1A, for example, the first traveler 16a, perhaps by using a surrogate device 29 (e.g., a smartphone, not shown), may send a message for the second traveler 16b to the sensing system 24 of the MV transportation hub information system 10. The system controller 20 then generates control signaling for the MV pixels 12 to project an image of the message to the second traveler 16b. The MV transportation hub information system 10 may thus allow one person to communicate to another using the MV displays 11. For example, if one person was waiting to meet or pick-up a traveler, or wanted to provide the traveler a welcome message, the person could use their surrogate device (e.g., phone or computer) to text the traveler a message that would appear on the shared MV display 11 of the MV transportation hub information system 10. As another example, business travelers or group tours could receive information about the whereabouts of fellow participants, meeting times and locations, and so forth, on the shared MV displays 11 of the MV transportation hub information system 10, such that the content on the shared MV displays 11 could be controlled by a business or group coordinator.

Figure 1B:
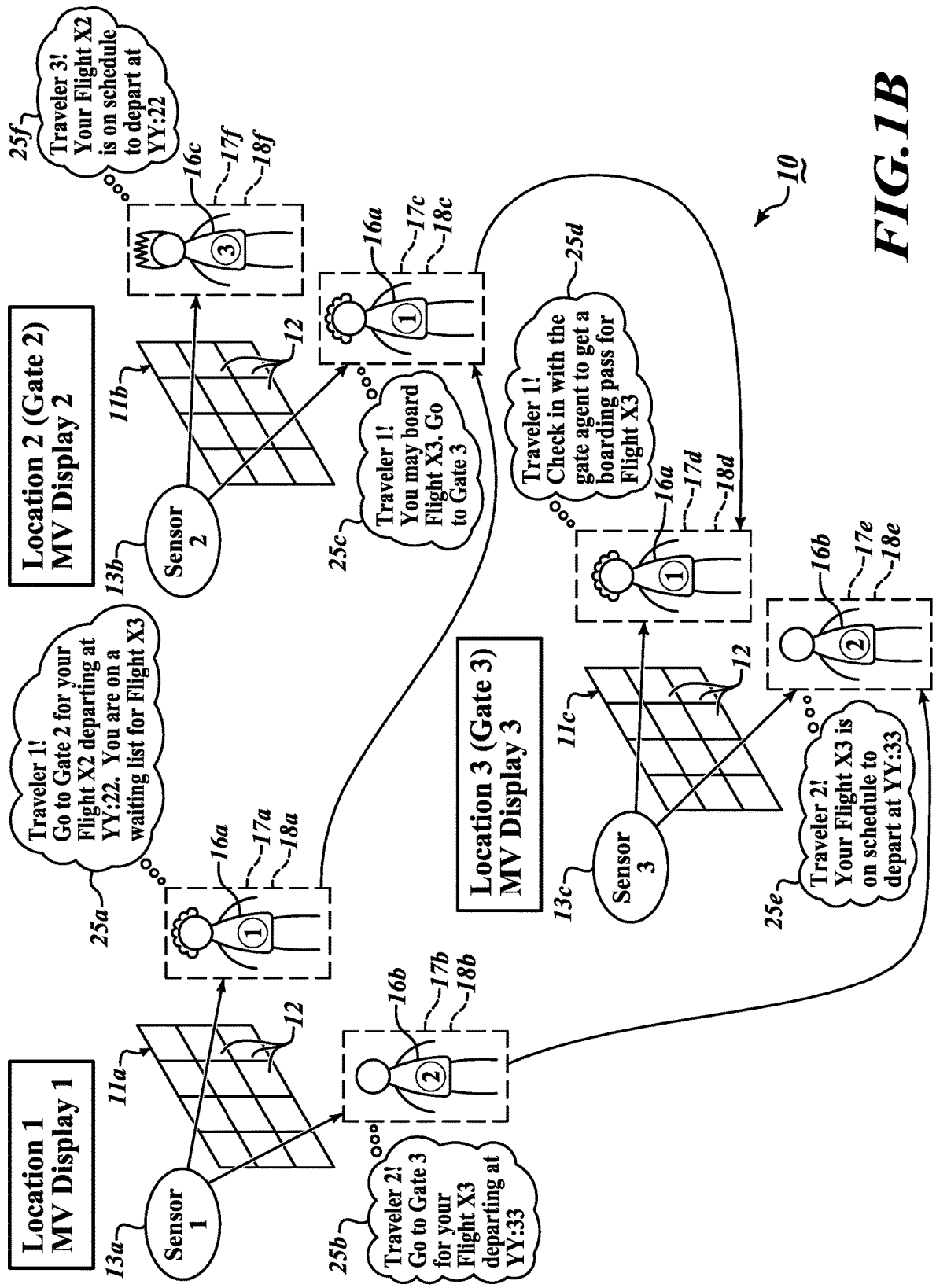
FIG. 1B depicts another embodiment of an MV transportation hub information system.

FIG. 1B is a diagram depicting another implementation example of an MV transportation hub information system 10. The MV transportation hub information system 10 in this example includes three MV displays 11a-11c each composed of one or more MV pixels 12, wherein each MV pixel 12 is configured to emit beamlets in different directions. The MV transportation hub information system 10 also includes sensors 13a-13c configured to detect the first blob 17a, the second blob 17b, and the third through the sixth blobs 17c, 17d, 17e and 17f. The MV transportation hub information system 10 further includes the input node 9 configured to receive attributes of travelers 16a-16c (three travelers ①②③ are shown). Specifically, the first attribute of the first traveler 16a, the second attribute of the second traveler 16b, and the third attribute of the third traveler 16c are received via the input node 9. As described above, various attributes of the respective travelers 16a-16c may be entered to the input node 9 in various manners, such as via the sensing system 24 detecting or sensing the attributes of the travelers 16a-16c. In the illustrated embodiment, the three sensors 13a-13c are provided in association with the three MV displays 11a-11c, respectively, though more or less MV displays and sensors may be provided. The sensors 13 may be provided not necessarily in association with any of the MV displays 11a-11c, as long as they can detect the first, second, and third through sixth blobs 17a-17f, to keep track of the presence of the first, second and third travelers 16a, 16b and 16c as they move about in a physical space of the transportation hub in which the MV displays 11 and the sensing system 24 are arranged.

Figure 2:
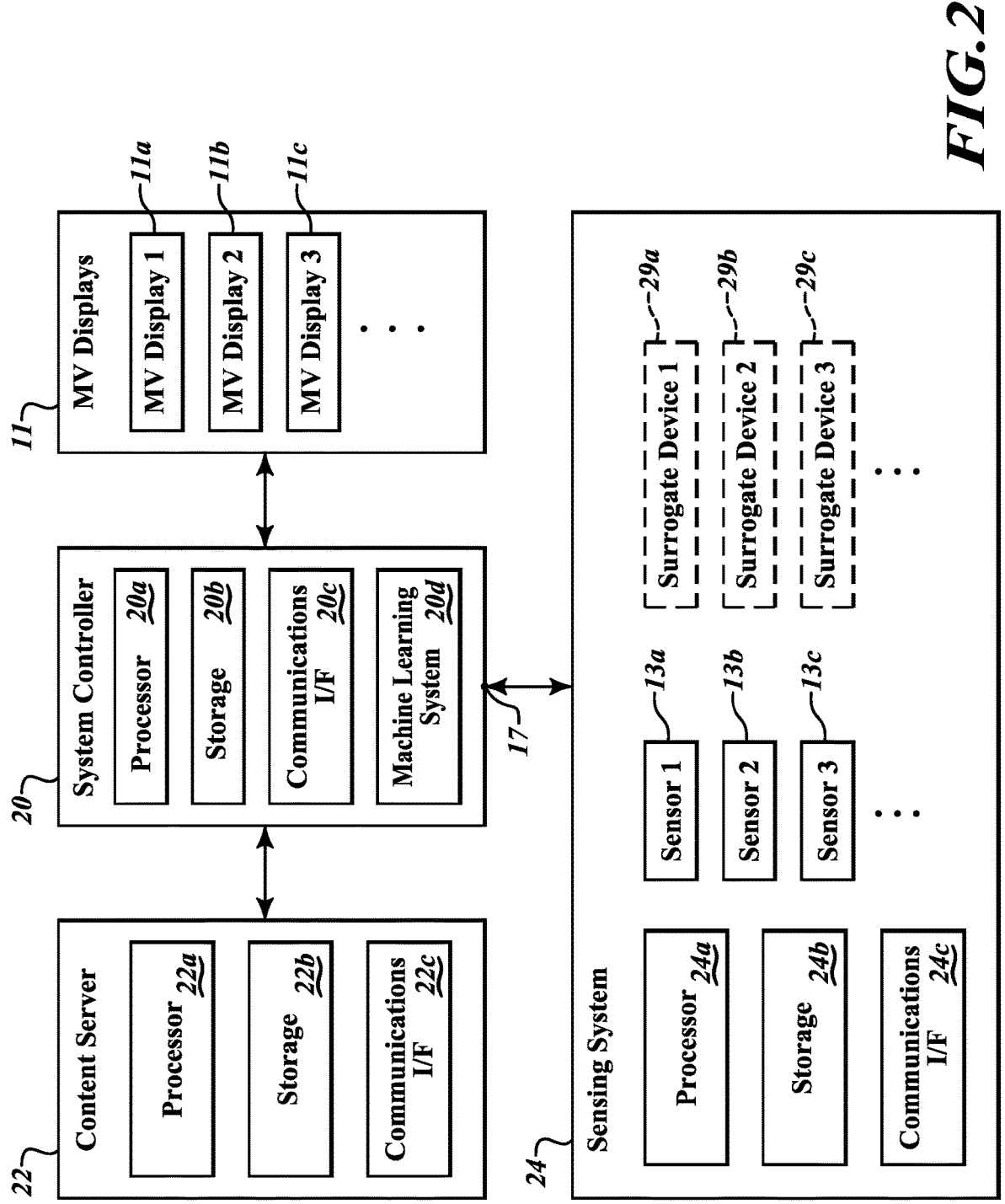
FIG. 2 depicts an embodiment of a system configuration of the MV transportation hub information system of FIGS. 1A and 1B.

Referring additionally to FIG. 2, which depicts a sample system configuration of the MV transportation hub information system 10 of FIGS. 1A and FIG. 1B, the MV displays 11a-11c and the sensors 13a-13c are coupled to one or more processors 20a, 22a, 24a which, in the illustrated embodiment, are distributed, in a connected manner, among a system controller 20, a content server 22, and a sensing system 24 of the MV transportation hub information system 10, although in other embodiments their functionalities may be distributed in different manners or may be consolidated into a single processor. The processors 20a, 22a, 24a may be a general-purpose computer capable of, among other tasks, executing an operating system, executing various device drivers, and executing specialized application software used in conjunction with various embodiments of the invention. In some embodiments, the processors 20a, 22a, 24a may be a special-purpose processor, collectively or individually. The processor 20a, 22a, 24a is capable of populating, updating, using and managing data in a processor-accessible memory or storage 20b, 22b, 24b. Briefly, the storage 20b, 22b, 24b is a volatile storage device (e.g., RAM) and/or a non-volatile, non-transitory storage device (e.g., ROM, EPROM, EEPROM, hard drive(s), flash drive(s) or other solid state memory technology, CD-ROM, DVD) capable of storing, among any other information, data, device drivers and specialized application software which, when executed, enables the processor 20a, 22a, 24a to perform various computations and processing as described in the present disclosure. Various components in the processors 20a, 22a, 24a may be realized by hardware, software, or a combination of hardware and software, and each component may be partly or entirely realized by circuitry, a general-purpose processor or a special-purpose processor executing a software algorithm.

The sensing system 24 in the illustrated embodiment includes the sensors 13a-13c coupled to a processor 24a, a storage 24b, and a communications interface 24c. The sensors 13a-13c may be configured to detect the first through sixth blobs 17a-17f, and may also detect a first attribute of the first traveler 16a, the second attribute of the second traveler 16b, the third attribute of the third traveler 16c, as well as various other attributes, characteristics, or data usable for the MV transportation hub information system 10. The sensors 13a-13c may be based on any suitable sensing technology including, without limitation, an optical sensor (e.g., camera, video camera, infrared sensor), an ultrasonic sensor, an acoustic sensor, a thermal imaging sensor, an electromagnetic (EM) interrogation system sensor capable of tracking an active object, a GPS system sensor capable tracking an active object, an RF sensor (e.g., RFID system including a reader capable of interrogating an RFID tag), an RF triangulation technique-based sensor, a radar sensor, interaction sensors (e.g., capacitive sensors to determine when a traveler touches an object at a stationary kiosk), motion sensors, sensors to detect presence of a personal device (e.g., surrogate devices 29a-29c) such as a cell phone, a smartphone or a tablet as well as to discover information from the personal device, etc. The sensing system 24 may work independently, or may draw on other sources of data to detect, distinguish or determine various attributes and characteristics. For example, the sensing system 24 may detect a particular cell phone in range, and then query an external database to find the identity of the user (the traveler) or the user's attributes (e.g., itinerary, travel preferences, travel history, mileage account information, etc.)

The multiple sensors 13a-13c may be suitably located relative to each other and relative to the MV displays 11a-11c to comprehensively detect the first through sixth blobs 17a-17f and other attributes, characteristics and data as the first, second and third travelers 16a, 16b and 16c move in the transportation hub. For example, one or more cameras having suitable lenses and lighting may be used to detect the blobs 17a-17f. In some embodiments, the camera(s) may be depth-aware cameras, such as structured light or time-of-flight cameras, which can generate a depth map of what is being seen through the camera at a short range. The depth map may then be processed to approximate a 3D representation of what is being seen. In other embodiments, the camera(s) may be stereoscopic cameras and/or LIDAR sensors. Multiple sensors 13a-13c of the same type, or of different types, may be used together. The sensing system processor 24a may run software applications (stored in the storage 24b) such as image processing software to process images captured by the sensors 13a-13c, and software that discerns or extracts an attribute/characteristic of the captured images including the identity of each imaged blob, for example. Any of a number of image processing techniques may be used including, without limitation, stitching/registration, morphological filtering, thresholding, pixel counting, image segmentation, face detection, edge detection, blob discovery and manipulation. The sensors 13a-13c may also include a biometric scanner configured to detect biometric attributes of the travelers, such as a facial recognition system, a fingerprint scanner, a retinal scanner, an iris recognition system, etc.

In various embodiments, the sensing system 24 includes surrogate devices 29a-29c associated with the travelers 16a-16c, respectively. Use of the surrogate devices 29a-29c can facilitate detection of the traveler attributes, such as the presence, location, identity, behavior, preferences, demographic information, itinerary, travel history, travel preferences, mileage account information, etc., of each traveler. This is because, in general, surrogate devices 29 make it easier to identify individual travelers, determine their location relative to an MV display, and establish communication between travelers and the MV transportation hub information system 10, whereby actions taken with the surrogate device can be received and interpreted by the MV transportation hub information system 10.

The surrogate devices 29a-29c may be, as non-limiting examples, tags (e.g., passive patterns such as QR code, active optical tags such as blinking IR LEDs, radio tags such as RFID tags, or ultrasonic tags) functioning as communicable/trackable objects that the travelers may carry or wear (e.g., incorporated in a ticket, pass, badge, wrist band, etc.), mobile devices (e.g., smartphones and other mobile computing devices) functioning as communicable/trackable objects that the travelers may carry or wear, conveyances that may transport the travelers such as airport carts, or any other types of markers that may serve as surrogates of the travelers. The surrogate devices 29 may include a user-interface (e.g., a smartphone, a tablet computer, a laptop, or a smartwatch), via which the travelers may input the traveler's attributes (e.g., itinerary number, mileage account information, travel preferences, etc.) to the MV transportation hub information system 10. Also, the surrogate devices 29 without a user-interface, such as a pointer device, may be used by the travelers to input information (e.g., attributes of the traveler, such as indication by the traveler to trigger, change or adjust the travel related content to be displayed to the traveler on the MV display 11) to the MV transportation hub information system 10. As another example, a traveler may use a surrogate device (e.g., by moving a pointer device relative to the MV display) to scroll-down or flip-through travel related content pages visible to the traveler on the MV display. Travelers could dynamically communicate with the MV transportation hub information system 10 in generally four ways: 1) enter information/requests/preferences using the UI device 19 such as a keyboard, a touch screen (e.g., of the check in kiosk 30 in FIG. 7A), or a microphone on a personal phone or other surrogate device); 2) scan or present a surrogate device such as a ticket 21 (see FIG. 7A), pass, card, RFID chip, or quick-read code, etc., at a station or kiosk (30 in FIG. 7A), or using a personal device such as a reader/scanner/camera on a smart phone, etc.; 3) through use of surrogate device (a smart phone, pointer device or wearable or other intuitive device); and 4) through gestures or body positioning as detected by the sensing system 24. When the surrogate devices 29 are used, the surrogate devices 29 essentially function as the UI device 19 of the MV transportation hub information system 10.

The sensors 13a-13c may be configured to communicate with (e.g., receive signals from, interrogate, etc.) the surrogate devices 29a-29c respectively associated with the travelers using any suitable sensing or location technologies or protocols such as Bluetooth, Wi-Fi, cellular, optical, ultrasound, or RFID technology, EM interrogation technology, or GPS technology. The sensing system communications interface (I/F) 24c is responsible for supporting wireless communications among the sensors 13a-13c, the surrogate devices 29a-29c, the sensing system processor 24a, and the system controller 20 using any suitable communications protocols.

To assist and guide different travelers throughout the transportation hub, the system controller 20, the content server 22, the sensing system 24 and the MV displays 11a-11c may communicate with each other, in a network setting, via their respective communications interfaces (I/F) 20c, 22c, 24c, via any suitable medium including wireline and/or wireless medium, and via any suitable protocol (e.g., Bluetooth, Wi-Fi, cellular, optical, ultrasound).

The system controller 20 is generally responsible for controlling the MV transportation hub information system 10 to assist and guide multiple travelers through the physical space of the transportation hub. The system controller 20 is coupled to the MV displays 11a-11c, the sensing system 24, and the input node 9. The system controller 20 includes the processor 20a, which may run software applications (stored in the storage 20b) to perform various functions such as software that performs user tagging to label (tag) each of different blobs 17a-17f as representative of one of many travelers 16a-16c. The system controller 20 defines the first and second viewing zones 18a/18b, located relative to the MV display 11a in a viewing zone coordinate system, based on the first and second blobs 17a/17b. The system controller 20 determines a mapping that translates between the viewing zone coordinate system and the one or more beamlet coordinate systems (to be described fully below). The system controller 20, based at least on the first and second attributes of the first and second travelers 16a/16b received via the input node 9, associates first and second travel related contents for the first and second travelers 16a/16b with the first and second viewing zones 18a/18b, respectively.

In various exemplary embodiments, the system controller processor 20a is configured to associate multiple travel related contents with multiple viewing zones of a single MV display so as to present multiple images containing multiple messages generated from the multiple travel related contents on the same MV display to the multiple travelers at the multiple viewing zones simultaneously. The MV display can thus guide and direct multiple travelers simultaneously. As used herein, an image presented to a traveler may be any of a static image, a stream of images (video), a text pattern, a lighting pattern, or any other expression of content that is visible to human eyes, as will be more fully described below.

In some embodiments, the system controller processor 20a may retrieve the first and second travel related contents from the content server 22. Briefly, the content server 22 includes a processor 22a, storage 22b which stores various contents (or content descriptors or content types), and communications interface (I/F) 22c. Alternatively or additionally, the content server 22 may include interfaces that feed content from content providers, such as a feed from a live camera, or a feed to a broadcasting station. Further alternatively or additionally, the controller processor 20a may generate the first and second travel related contents on the fly using computer-executable algorithms, which may be stored in the content server 22.

The system controller processor 20a is configured to determine (select or design) travel related content, information, experiences for different travelers simultaneously, for example by directing the travelers to navigate through the transportation hub according to their respective itineraries, providing advertisement on food, drinks, duty-free shopping, hotels, etc., which match the respective travelers preferences, managing travelers flow or distribution in the physical space of the transportation hub, issuing travel alerts, etc. The system controller processor 20a of the MV transportation hub information system 10 controls one or more MV displays 11a-11c (see FIGS. 1A and 1B) so that each MV display 11 shows different (customized) images to different travelers simultaneously, to support the respective travelers' travel experiences which are different from each other.

FIG. 3 depicts an embodiment of a multi-view (MV) display 11, which is coupled to the system controller processor 20a and the sensors 13a-13c, and optionally coupled to the UI device 19 to collectively form the MV transportation hub information system 10 of FIGS. 1A and 1B. The MV display 11 includes one or more multi-view (MV) pixels 12 (twelve MV pixels 12a-12l are included in the illustrated example), wherein each MV pixel 12 is configured to emit beamlets 14 in different directions, as additionally depicted in FIG. 8. "Beamlets" as used herein means individually controllable beams emitted from an MV pixel. FIG. 8 illustrates one of the MV pixels 12a-12l emitting multiple beamlets 14 in multiple directions. Unlike an image projector that emits a number of light beams to form an image on a screen, the beamlets 14 from each MV pixel 12 are intended to fall upon the eyes of multiple viewers, such that the multiple viewers respectively see different beamlets (e.g., in different colors and brightness) originating from the same MV pixel(s) 12. As a consequence, the appearance of each MV pixel 12 from the perspective of a viewer is dependent upon the angle at which the viewer looks to the MV pixel 12. For ease of illustration the MV pixel 12h in FIG. 8 is depicted to emit a few beamlets 14, though it should be understood that many more beamlets 14, for example in the order of millions, may be emitted from the MV pixel 12h and from any of the other MV pixels 12.

Referring back to FIG. 3, the MV transportation hub information system 10 includes the input node 9 which, in operation, receives the first attribute of the first traveler 16a and the second attribute of the second traveler 16b. For example, the sensor 13 may be used to detect the first or second attribute of the first or second traveler 16a or 16b and transmit the detection signals indicative of characteristics (e.g., presence, identity, behavior, etc.) of the first and second travelers 16a and 16b as the first and second attributes to the input node 9. The system controller processor 20a performs user tagging by labeling (tagging) the first blob 17a, detected by the sensors 13a-13c, as corresponding to the first traveler 16a and labeling (tagging) the second blob 17b, also detected by the sensors 13a-13c, as corresponding to the second traveler 16b.

The system controller processor 20a may define, based on the received positions of the first and second blobs 17a/17b, the first and second viewing zones 18a/18b located relative to the MV display 11a in a viewing zone coordinate system. In the illustrated embodiment, the first and second viewing zones 18a ("ZONE 1") and 18b ("ZONE 2") are defined in a viewing zone coordinate system 40, as additionally depicted in FIG. 5. Definition of the first and second viewing zones 18a/18b may be performed in any consolidated or distributed processing configuration. For example, the sensing system processor 24a may define the identified locations of the first and second blobs 17a and 17b as the first and second viewing zones 18a and 18b, respectively, which may then be inputted to the processor 20a via the input node 9.

Figure 5:
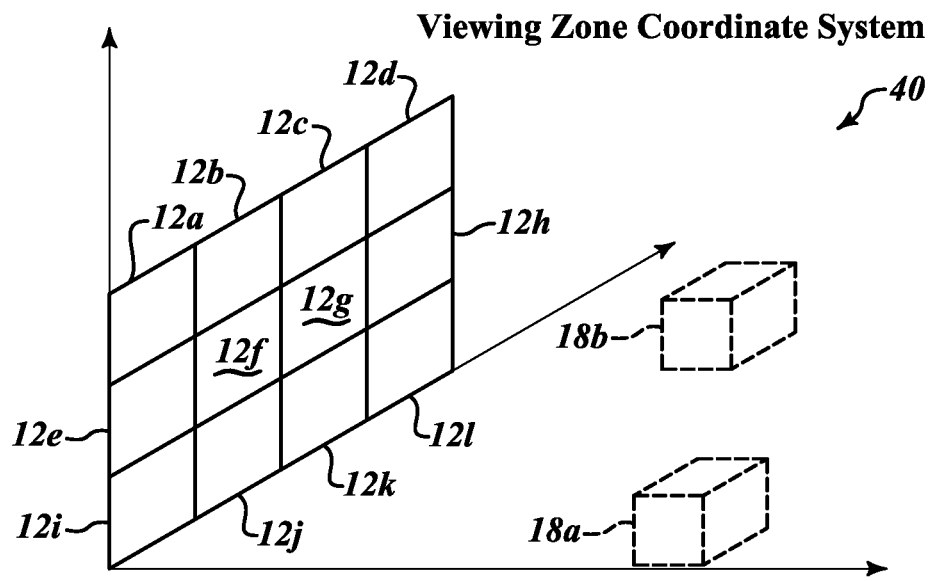
FIG. 5 depicts a viewing zone coordinate system in 3D according to an embodiment.

FIG. 5 illustrates the two viewing zones 18a and 18b, respectively specified as three-dimensional volumes (e.g., boxes), located relative to the one or more MV pixels 12a-12l of the MV display 11. Each viewing zone 18 defines an observation point at which an image formed by the one or more MV pixels 12a-12l is visible. The viewing zone 18 may be defined as a three-dimensional volume (a collection of observation points in 3D), as a two-dimensional area (a collection of observation points in 2D), or as a point.

The viewing zone coordinate system 40 may be any suitable coordinate system, such as a Cartesian coordinate system, or a polar coordinate system in which multiple viewing zones are positioned to surround the one or more MV pixels, for example. Any suitable 3D space modeling method may be used to define the viewing zone coordinate system 40, such as a map, point cloud, wire polygon mesh, and textured polygon mesh. In some embodiments, the viewing zone coordinate system 40 may be based on the physical dimensions of a viewing area in which the multiple viewing zones 18 are defined.

In some embodiments, the viewing zone coordinate system 40 may be within sight of a 3D sensor attached to the MV pixels (e.g., a depth sensor, a stereoscopic camera) and the viewing zone coordinate system 40 can be the 3D coordinate system of the 3D sensor. For example, a real-life 3D environment is scanned by a 3D sensor (e.g., stereoscopic camera) to derive the 3D viewing zone coordinate system 40, in which multiple viewing zones may be specified.

Figure 6:
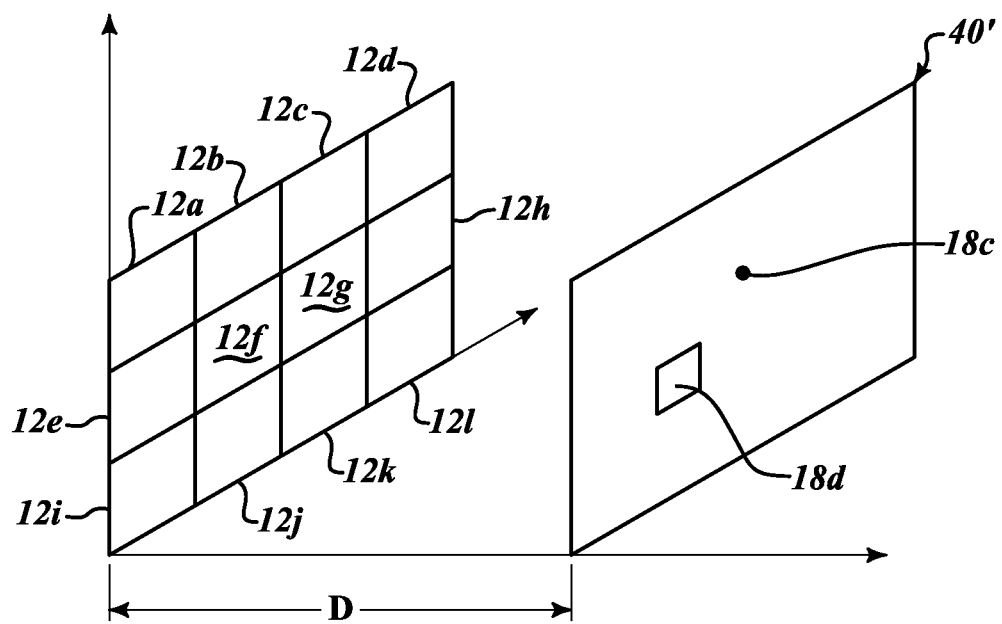
FIG. 6 depicts a viewing zone coordinate system in 2D according to an embodiment.

In other embodiments, the viewing area may be within sight of a 2D camera attached to the MV pixels, wherein the 2D camera is used as a sensor to identify the multiple travelers to be respectively associated with multiple viewing zones. In this case the viewing zone coordinate system 40 is based on the 2D pixel coordinate system of the 2D camera. For example, FIG. 6 illustrates a sample viewing zone coordinate system 40' in 2D, which may be based on the 2D pixel coordinate system of the 2D camera (not shown). In this example, the 2D viewing zone coordinate system 40' is set on a plane at a distance D from the one or more MV pixels 12a-12l. A point 18c or an area 18d may be specified in the 2D viewing zone coordinate system 40' to represent a viewing zone. It is noted that the 2D viewing zone coordinate system 40' may be in a shape other than a plane, such as a hemisphere or other non-planar surface. In some embodiments, it may be desirable for each point in the 2D viewing zone coordinate system 40' to have a unique viewing angle to the MV pixels 12a-12l, such that the bundle of beamlets directed towards each viewing zone, which is formed of one or more of those points each having a unique viewing angle, can be uniquely identified. Then, multiple non-overlapping viewing zones in the 2D viewing zone coordinate system 40' may be associated with (or "hit" by) mutually exclusive bundles of beamlets.

A variety of techniques can be used to determine the appropriate content to show to each traveler/viewer. As an example, a boarding pass scanner can be placed within or in proximity to the viewing area of the MV display 11. A traveler/viewer can scan their boarding pass at the scanner, which communicates to the system controller 20 to determine the content to be shown to the traveler/viewer that just scanned in. For instance, the traveler/viewer can see their flight information, wayfinding directions to their gate, the amount of time before boarding, upgrade request status, or flight delay notifications, as illustrated in FIGS. 1A and 1B for example. The system controller 20 can associate the determined content with the detected blob 17 standing in front of the scanner. Then, as the traveler/viewer moves, the sensing system 24 and the system controller 20 can continue to tag the viewer's blob 17 with their content, so the viewer will continue to see their individualized content on the shared MV display 11.

FIG. 7A illustrates a sample UI device 19 in the form of a stationary kiosk 30 (e.g., check in kiosk) located at an airport, which includes a touch pad screen 31 and a ticket scanner 13d. The first traveler 16a is standing in a registration region 33 located immediately in front of the scanner 13d to scan in a boarding pass 21. The touch pad screen 31 may output/display information to the first traveler 16a and may input/receive information such as various attributes of the first traveler 16a via touch pad entry. The ticket scanner 13d reads the boarding pass 21, which allows for the system controller 20 to determine, retrieve or identify one or more attributes of the first traveler 16a, such as the traveler's identity, behavior, itinerary, travel history, travel preferences, etc. In FIG. 7A, the sensing system 24 detects the first blob 17a based on a human-shaped image of the first traveler 16a standing in the registration region 33. Before the first traveler 16a scans in the boarding pass 21, the identity of the first blob 17a is not yet known to the system controller. When the first traveler 16a scans in the boarding pass 21, the system controller 20 can determine the identity of the traveler 16a based on the boarding pass 21. The system controller then performs user tagging by labeling (tagging) the first blob 17a as corresponding to the first traveler 16a based on the assumption that whoever is standing in the registration region 33 in front of the kiosk 33 when the boarding pass 21 is scanned is most likely the traveler himself/herself identified in the boarding pass 21. Thus, user tagging is performed in this case by tagging a blob in the registration region 33, when a traveler's identity is determined through a registration process (e.g., a boarding pass scanning process), with the determined traveler identity, which is one attribute of the traveler. The MV transportation hub information system 10, using the sensing system 24, may continuously track movement of the first traveler 16a after the first traveler 16a moves out of the registration region 33 while continuously tagging the tracked blob with the identity of the first traveler 16a. For example, as illustrated in FIG. 1B, the sensing system 24 updates the location of the blob associated with the first traveler 16a, from the first blob 17a in Location 1, to the updated first blob 17c in Location 2, to the further updated first blob 17d in Location 3, while the system controller 20 continuously tagging all of the blobs 17a, 17c and 17d with the first traveler 16a. The system controller 20 may continuously update the location of the traveler's viewing zone also, so that the traveler continues to see their individualized content.

In the above described embodiment, the registration region 33 can be defined in the viewing zone coordinate system 40. When the system controller 20 detects that a boarding pass 21 is scanned, the system controller can associate the attributes, profiles, or content determined by the scan with the blob within the registration region 33.

An alternative technique for content association is a technique based on user input via a user-interface device 19. For example, a stationary kiosk 30 comprising a PC or touchscreen 31 in FIG. 7A can be used to allow travelers/ viewers to input their information or preferences to the transportation hub information system 10. In one embodiment, a tablet interface 31 could provide a set of language selections, where a viewer can choose the language in which the content on the shared MV display 11 would appear. In another embodiment, the user interface 19 could allow viewers to input information necessary for airport location operations for wayfinding directions, such as a restaurant, lounge, or restrooms.

Another technique for content determination is a biometric system, such as a fingerprint scanner, retinal scanner, iris recognition system, or facial recognition system incorporated in the sensing system 24. The viewer's content can be stored in a database and associated with their biometric features. Biometric systems can be used as a method of reacquisition, such that viewers do not have to re-enter their preferences or scan a ticket 21 each time they would like to engage with the transportation hub information system 10. For example, a viewer can scan their boarding pass 21 at the scanner 13d and register their face into a facial recognition system, and the system controller 20 can associate the content for the scanned boarding pass 21 with the facial biometric profile.

Yet another example technique is using a mobile device with an associated localization system. For example, Wi-Fi or ultra-wideband triangulation, Bluetooth-based techniques (e.g. ranging via time-of-flight, signal strength, or angle-of-arrival; localization via signal strength fingerprinting), or ultrasound techniques can be used to find locations of mobile devices (i.e., traveler surrogate devices 29) in the environment. A viewer with a smartphone with the localization system enabled can sign into or input their preferences into a mobile app. The system controller 20 can associate the viewer/traveler closest to the mobile device with the content determined from the input preferences. In such a system, the mobile device location can be defined in a mobile device coordinate system, and a mapping between the mobile device coordinate system and the beamlet coordinate systems and/or the viewing zone coordinate system can be determined via a calibration procedure. Mobile device to viewer association (i.e., user tagging) can be determined using nearest neighbor matching, combinatorial optimization, classifiers trained using machine learning algorithms, dynamic time warping, or other techniques. Briefly, dynamic time warping is a technique for determining the amount of temporal correlation between two time-varying quantities. The dynamic time warping technique computes a similarity score between two quantities based on how similar their variation over time looks, with some accounting for the fact that the variation may not happen at the exact same time or speed. These same techniques can also be used to fuse results from multiple localization systems for better association accuracy.

Referring back to FIG. 2, the system controller processor 20a may include or be coupled to a machine learning system (e.g., a machine learning engine) 20d for automated improvements and enhancements in the user tagging capability to associate the first blob 17a with an attribute (e.g., the identity, behavior, surrogate device, etc.) of the first traveler 16a and associate the second blob 17b with an attribute (e.g., the identity, behavior, surrogate device, etc.) of the second traveler 16b. Learning/inference systems and machines, as discussed in this disclosure, may fall under the technological titles of machine learning, artificial intelligence, artificial neural networks (ANN), probabilistic inference engines, accelerators, and the like. For example, an ANN model may be trained suitably for application in different domains, e.g., ANNs can be used for (e.g., sensors) signal processing as in Human Activity Recognition and for many other learning-based tasks. Known classification problems, such as computer vision and signal processing applications, benefit from the use of learning/inference machines, such as deep convolutional neural networks (DCNN), fuzzy-logic machines, etc.

For example, a DCNN is a computer-based tool that processes large quantities of data and adaptively "learns" by conflating proximally related features within the data, making broad predictions about the data, and refining the predictions based on reliable conclusions and new conflations. The DCNN is arranged in a plurality of "layers," and different types of predictions are made at each layer.

For example, if a plurality of two-dimensional pictures of faces is provided as input to a DCNN, the DCNN will learn a variety of characteristics of faces such as edges, curves, angles, dots, color contrasts, bright spots, dark spots, etc. These one or more features are learned at one or more first layers of the DCNN. Then, in one or more second layers, the DCNN will learn a variety of recognizable features of faces such as eyes, eyebrows, foreheads, hair, noses, mouths, cheeks, etc.; each of which is distinguishable from all of the other features. That is, the DCNN learns to recognize and distinguish an eye from a nose or any other facial feature. In one or more third and then subsequent layers, the DCNN learns entire faces and higher order characteristics such as race, gender, age, emotional state, etc.

For example, the machine learning system 20d may use machine learning models to train one or more models for associating mobile devices detected in a mobile device coordinate system by a mobile device localization system (e.g., Bluetooth) of the sensing system 24 with blobs of respective travelers 16. Specifically, a machine learning model can select a particular mobile device, whose owner identity is known, which is likely to be held by a particular "blob" detected by the sensing system 24, to thereby match different mobile devices with different "blobs", respectively.

A typical (supervised) machine learning approach involves creating a generic mathematical function which takes an input of some kind and produces an output that corresponds to that input. The model contains many free parameters which can be adjusted so that the model is able to more accurately predict the correct output for a given input. Given many known input-output pairs, the training algorithm adjusts the parameters so the discrepancy between the predicted outputs and true outputs (for the given input) is as low as possible across all pairs. This is done in using typical mathematical optimization algorithms.

Several different models can be used depending on the type of sensor data being used. For example, one approach may involve inputting a list of blob positions at a specific point in time and a list of phone positions (surrogate device positions) at the same point in time and outputting a list of correspondences between the two. Another approach may involve inputting a list of blob positions at a specific point in time and a list of phone sensor data points (e.g. Bluetooth/

Wi-Fi RSSI values). Either approach may be extended by inputting a data across multiple points in time so that time correlation between the two data sets can provide additional information for matching. Yet another approach might involve inputting the path traveled by a single blob over a period of time and the values of from a phone sensor over that same period of time and outputting a similarity score. The phone sensor data with the highest similarity score for a given blob path would then be the most likely corresponding phone. In all cases, the type of information encoded in the input data determines what is available for the machine learning algorithm to use in determining accurate predictors of correspondence. The actual model structure is determined by the data type (e.g. recursive neural networks for time-series data, convolutional neural networks for spatial data, etc.).

Input-output pairs for training can be obtained from physical hardware. For example, the desired blob tracking system and phone tracking system can simply be run at the same time under controlled conditions (e.g. where it is simple to know which phone matches which blob). Simulation techniques can be used to generate additional data as well. Physical data gathered from hardware can be corrupted artificially with noise, for example, to produce bad input-output pairs. Fully synthetic data can also be generated using models of blob and phone tracking systems; this would greatly increase the number of scenarios and amount of data that can be gathered.

Figure 11:
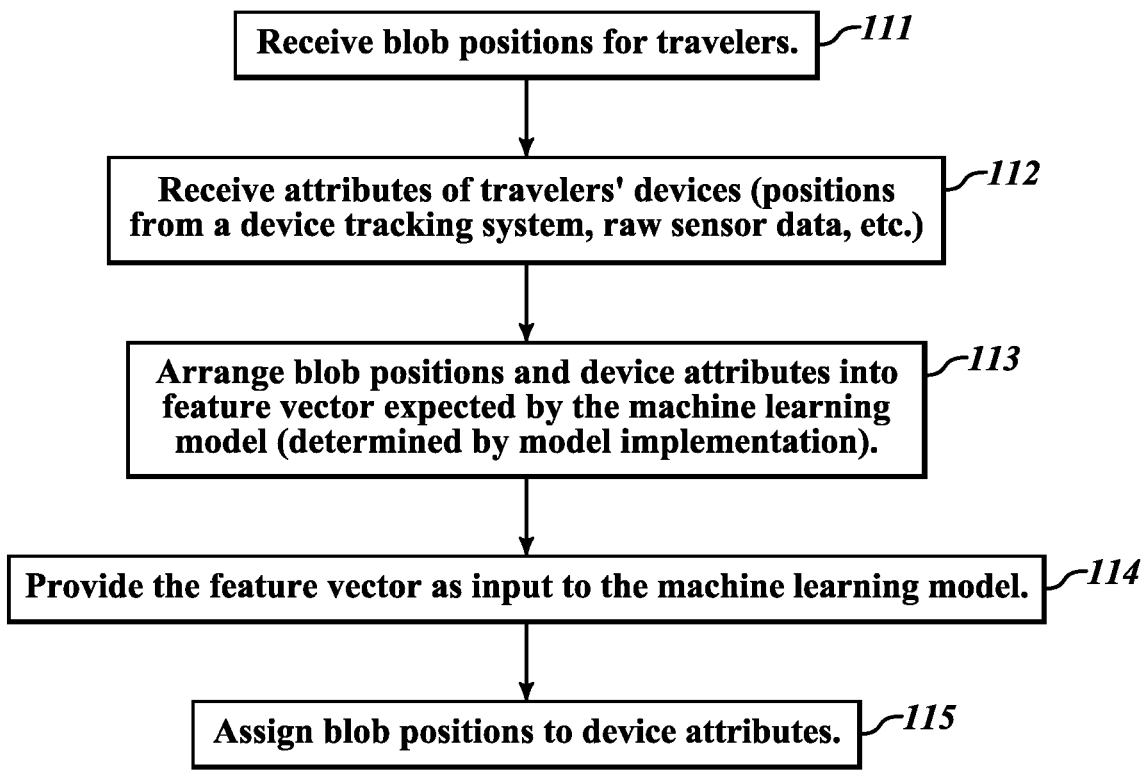
FIG. 11 is a flowchart depicting a sample user tagging process to label sensed "blobs" as corresponding to different surrogate devices of different travelers, respectively, using a machine learning technique according to one embodiment.

FIG. 11 is a flowchart depicting a sample user tagging process to label (tag) sensed "blobs" as corresponding to different surrogate devices of different travelers, respectively, using a machine learning technique according to one embodiment. The user tagging process may be implemented by the machine learning system 20d of the controller processor 20a, described above.

The user tagging process includes generally five steps. Step 111 includes receiving blob positions for travelers, such as a first location of a first blob and a second location of a second blob.

Step 112 includes receiving attributes of travelers surrogate devices, such as positions of the surrogate devices as determined from a device tracking system, raw sensor data, etc.

Step 113 includes arranging blob positions and device attributes (e.g., device positions) into a feature vector expected by a machine learning model as determined by model implementation.

Step 114 includes providing the feature vector as input to the machine learning model.

Step 115 includes assigning blob positions to device attributes, such as device positions, so as to associate blobs with their corresponding surrogate devices.

Figure 12:
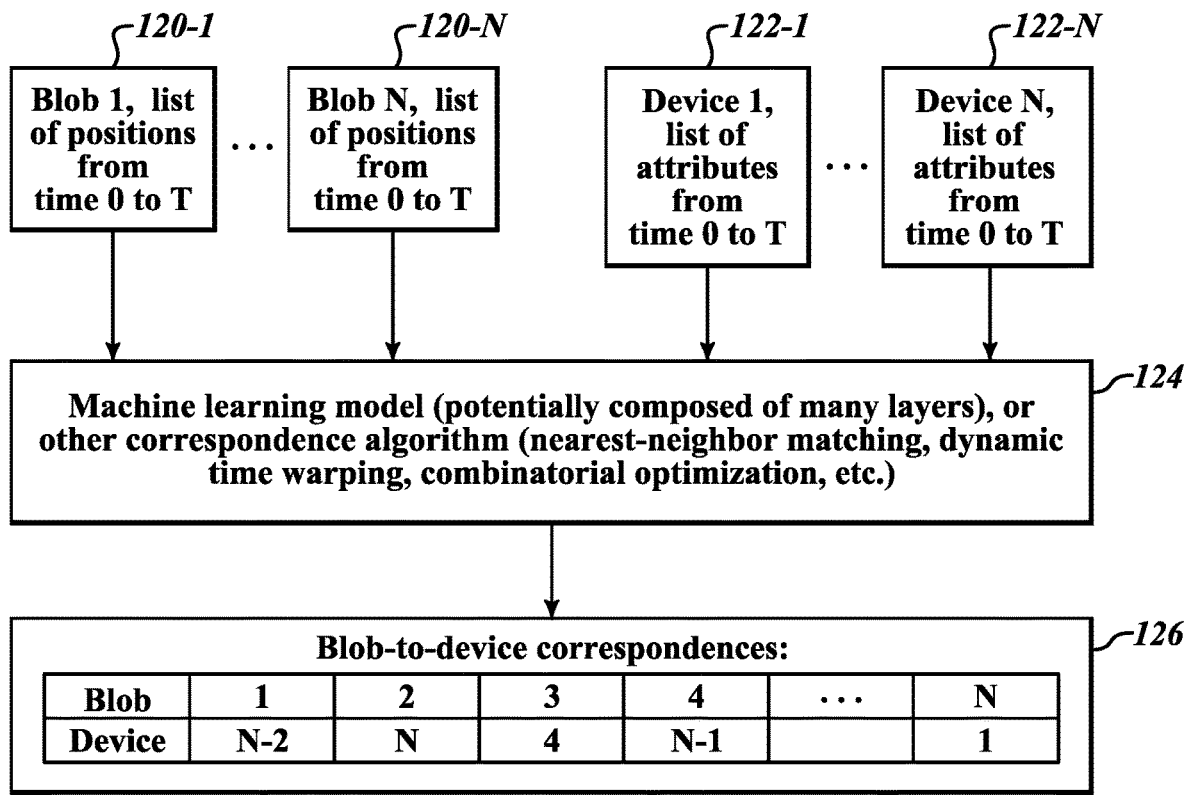
FIG. 12 is a schematic diagram of a machine learning apparatus for performing user tagging to associate sensed "blobs" with different surrogate devices of different travelers, respectively, according to one embodiment.

FIG. 12 is a schematic diagram of a machine learning apparatus for performing user tagging to associate sensed "blobs" with different surrogate devices of different travelers, respectively, according to one embodiment. In the illustrated embodiment, a list of blob positions at a specific point in time 120-1 . . . 120-N and a list of surrogate device attributes (e.g., surrogate device positions or surrogate device sensor data points) at the same point in time 122-1 . . . 122-N are input to a machine learning model 124, which may comprise many layers. The machine learning model 124 may be replaced with, or supplemented by, other corresponding algorithm (e.g., nearest-neighbor matching algorithm, dynamic time warping algorithm, combinatorial optimization algorithm, etc.) The machine learning model 124 then outputs a list of correspondences between the two 126, i.e., the list of "blob-to-device" correspondences, as illustrated.

The machine learning techniques may be used stand alone or in connection with other user tagging techniques to match the blobs 17a-17n detected by the sensing system 24 with attributes (e.g., surrogate devices whose owners are known) of the travelers 16a-16c, respectively (see FIG. 1A). For example, as shown in FIG. 7A, user tagging may be performed by the first traveler 16a scanning in their boarding pass 21 with the scanner 13d at the stationary kiosk 30 such that the first blob 17a sensed in the registration region 33 is associated with the first traveler 16a identified in the scanned boarding pass 21, based on the assumption that the traveler must be standing within the registration region 33 to scan their boarding pass. Since this technique is based on the assumption, the machine learning techniques may be additionally used to further improve the user tagging accuracy based on the vast amount of training data collected by the sensing system 24 and stored in storage 24b.

The content to be shown to a viewer can be determined based on analysis of the viewer's behavior. For example, if a viewer walked out of a gate, the MV transportation hub information system 10 can assume the viewer has deboarded the plane, train, etc. and desires to see arrival content.

The sensors 13a-13n of the sensing system 24 may be used to detect attributes of the viewers/travelers 16, such as their behavior, and to send the detected attributes to the processor 20a via the input node 9 as shown in FIG. 3.

Figure 7B:
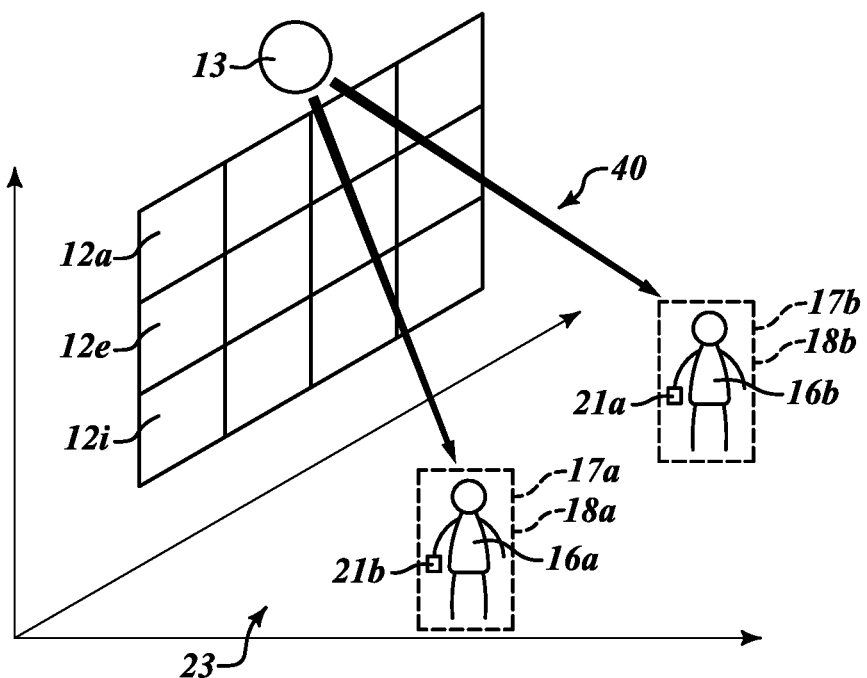
FIG. 7B depicts sample use of a sensor to facilitate user tagging including sensing and tracking "blobs" while continuously labeling (tagging) the blobs as travelers or traveler surrogate devices, wherein multiple viewing zones may be defined based on the blobs.

FIG. 7B illustrates a sample sensor 13, which can detect the first and second blobs 17a and 17b based on, for example, detected human-shaped images whose identity is not known. The sensor 13 may also identify (e.g., detect) a first traveler surrogate device, such as the first boarding pass 21a held by the first traveler 16a including a tag readable by the sensor 13. The location of the first boarding pass 21a or the second boarding pass 21b may be detected or calculated by the system controller 20. The system controller 20 may perform user tagging by tagging the first blob 17a with the attribute (e.g., the identity) of the first traveler 16a, wherein the identity is determined from the first boarding pass 21a, and by similarly tagging the second blob 17b with the attribute (e.g., the identity) of the second traveler 16b, wherein the identity is determined from the second boarding pass 21b.

In the illustrated example of FIG. 7B, the MV transportation hub information system 10, after performing user tagging to identify locations of the first and second travelers 16a and 16b, may define the first and second viewing zones 18a and 18b based on the identified locations. For example, a point, a 2D shape and/or a 3D shape may be assigned to each detected traveler 16 (e.g., a 3D box that encloses the traveler 16); and thereafter the assigned point, 2D shape and/or 3D shape may be used to define the viewing zone 18 for the traveler 16. The processing to specify multiple viewing zones based on the locations of the travelers 16a/16b may be performed by a processor of the sensor 13 and/or the system controller processor 20a of the MV transportation hub information system 10.

In further embodiments, the sensor 13 may be configured to identify (e.g., pick up) further attributes of the viewing zone, such as audio (e.g., speech or other sound made by a traveler or traveler surrogate), temperature (e.g., heat emanating from a traveler or traveler surrogate), etc. The identified attributes may be used, for example, by a zones-and-contents association module 36 of the processor 20a, to be described below, to select or generate appropriate travel related content for the viewing zone (e.g., a cold drink advertisement selected/generated for a traveler in a high-temperature viewing zone). As one example, attributes such as the traveler's body temperature or other symptoms or signs of distress or illness may be picked up by the sensors 13 (e.g., infrared sensor, camera, etc.) and processed or analyzed to identify the traveler who may be ill. As another example, various traveler attributes may be collected by the sensors 13 to implement disease control and prevention. For example, the sensors 13 may collect traveler attributes to detect whether the travelers are wearing face masks, maintaining social distancing, following other safety protocols, and so forth. The MV transportation hub information system 10 may also access medical records, vaccination verification, exposure tracking databases, and so forth, stored in the storage 20b, 22b and 24b, as part of implementing disease control and prevention. Then, on a personalized basis, the system controller 20 may formulate and send appropriate messaging, via the MV display(s) 11, to each traveler to promote safer and healthier travel conditions.

FIG. 8 schematically depicts one or more beamlet coordinate systems 42, which may be any suitable coordinate system such as a Cartesian coordinate system and a polar coordinate system. The beamlets of a MX pixel 12 can be defined using a beamlet coordinate system 42, and multiple beamlet coordinate systems may be configured for multiple MV pixels 12a-12h, respectively. The beamlet coordinate system 42 identifies each of the beamlets emitted from the MV pixel 12, which follows a specific propagation path. For example, the propagation path of each beamlet may be defined by the beamlet's origin in the MV pixel and the (unit) vector that defines its propagating direction, or may be characterized by a combination of angles such as azimuth α and altitude β angles formed by the beamlet. As further examples, any suitable 3D space modeling method may be used to define the beamlets' propagation paths in the beamlet coordinate system 42, such as a point cloud method that specifies a set of data points that form each propagation path or a voxel data method that specifies a set of voxels (a volume having unit x-y-z dimensions) that form each propagation path. Other 3D modeling methods may be used, such as a 3D map, wire polygon mesh, and textured polygon mesh. In some embodiments, as illustrated in FIG. 8, the beamlet coordinate system 42 explicitly identifies each of the beamlets by the beamlet's origin 15a, 15b, 15c . . . , in each MV pixel 12a, wherein each beamlet's origin is implicitly associated with its propagation path. In other embodiments, the beamlet coordinate system 42 may explicitly identify each of the propagation paths of the beamlets.

In some embodiments, the propagation path of each beamlet may be found based on a geometric model of the one or more MV pixels. For example, the geometric definitions of and relationships among the beamlets of an MV pixel may be found in a factory via calibration measurements, or may be inferred from the opto-mechanical design of the MV pixel, such as a known radial distortion of a lens included in the MV pixel. In various embodiments, the beamlets (e.g., the sources of the beamlets) in each MV pixel are arranged in a geometric array (e.g., 2D array, circular array). Propagation paths of the beamlets arranged in a geometric array can be geometrically defined using any suitable mathematical techniques including, without limitation, linear interpolation; linear extrapolation; non-linear interpolation; non-linear extrapolation; Taylor-series approximation; linear change of reference frame; non-linear change of reference frame; polynomial, spherical and/or exponential models; and trigonometric manipulation. As a particular example, once the propagation paths of selected beamlets are geometrically defined, suitable interpolation techniques may be used to find the propagation paths of the beamlets between those geometrically-defined beamlets. In other embodiments, the propagation path of each beamlet may be found by flashing patterns on the MV pixels (e.g., by selectively turning on and off the beamlets on each MV pixel) to uniquely encode every beamlet, and capturing the images of the flashing patterns using a camera placed in a viewing area of the MV pixels. The captured images can then be plotted onto the beamlet coordinate system 42 to geometrically define respective propagation paths of the beamlets. Various encoding patterns may be used as the flashing patterns, including, without limitation, Gray-code patterns, non-return-to-zero (NRZ) digital sequences, amplitude-shift-keyed (ASK) bits, maximum-length sequences, and shift-register sequences.

Although beamlets 14 are depicted in the accompanying figures as simple lines with arrowheads indicating their directions of emission, they can have an angular component and can be in any shape. Thus, characterization of the beamlet as a simple line is an approximation, which is a valid model in some embodiments but in other embodiments the beamlet may be modeled as having a shape similar to the beam from a search light, for example. In various exemplary embodiments, each beamlet 14 is wide/large enough such that both eyes of a traveler are expected to be within the beamlet 14 and the beamlet 14 falls upon both eyes of the traveler. Thus, the traveler sees the same beamlet 14 (e.g., the same color and brightness) with both of the eyes. In other embodiments, each beamlet 14 is narrow/small enough such that two different beamlets 14 are individually controlled to fall upon two eyes of a traveler, respectively. In this case the traveler sees two beamlets 14 of possibly different colors and/or brightness with their two eyes, respectively.

Figure 4:
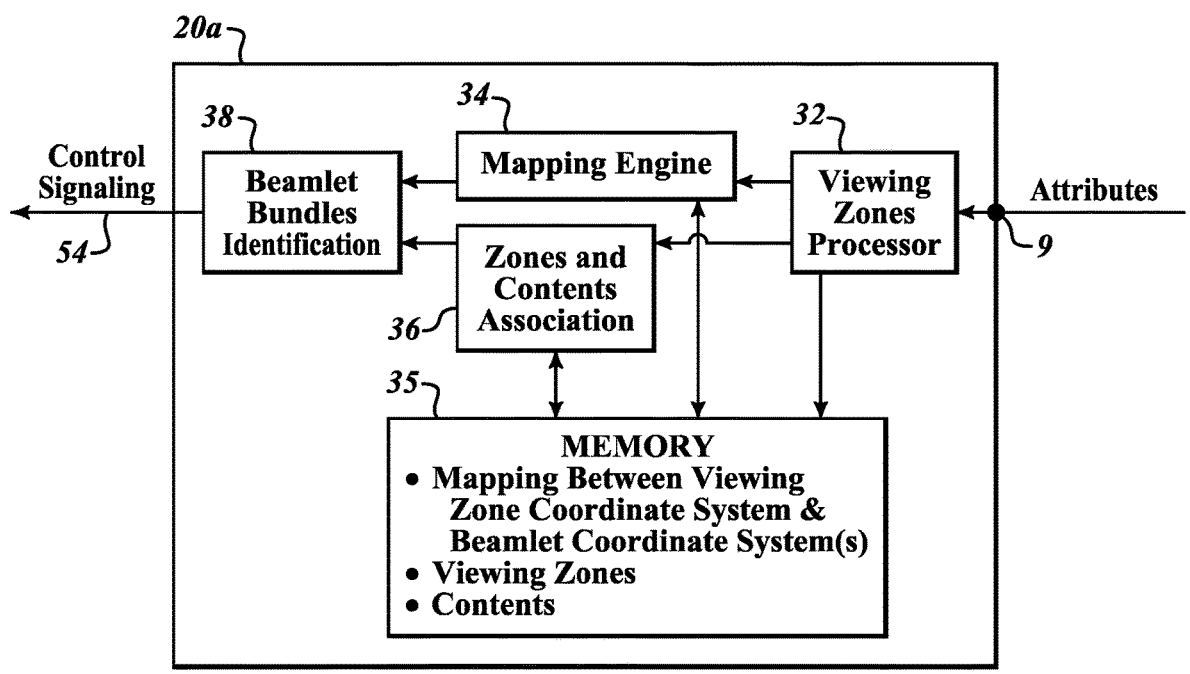
FIG. 4 depicts an embodiment of the processor of FIG. 3.

Now referring to FIGS. 2 and 4, the processor 20a is capable of populating, updating, using and managing data in a processor-accessible memory 20b/35, which is illustrated as part of the processor 20a though may be provided external to the processor 20a in some embodiments. Although the memory 35 is illustrated as a single device in FIG. 4, in various embodiments, the memory 35 may be divided into multiple storage devices.

The processor 20a receives, via the sensing system 24, a first location of the first blob 17a and a second location of the second blob 17b, and receives, via the input node 9, the first and second attributes of the first and second travelers 16a and 16b, respectively. The processor 20a performs user tagging to tag the first blob 17a with the first attribute of the first traveler 16a and tag the second blob 17b with the second attribute of the second traveler 16b. The processor 20a defines, in a viewing zone coordinate system, a first viewing zone 18a based on the first blob 17a and a second viewing zone 18b based on the second blob 17b.

The processor 20a associates first and second travel related contents with the first and second viewing zones 18a and 18b, respectively, based at least on the first and second attributes of the first and second travelers 16a and 16b. This may be done by associating the multiple contents themselves with the multiple viewing zones 18a and 18b, or by associating multiple content descriptors, such as multiple content providers (e.g., live stream sources, cable channels of travel content) or multiple content types, with the multiple viewing zones 18a and 18b.

The processor 20a determines (e.g., identifies, accesses) a mapping that translates between the viewing zone coordinate system 40 (FIG. 5) and one or more beamlet coordinate systems 42 (FIG. 8). In various embodiments, a mapping between the viewing zone coordinate system 40 and the one or more beamlet coordinate systems 42 is generated and stored (or pre-stored) in the memory 35, which the processor 20a may access. In other embodiments, the processor 20a may generate a mapping between the viewing zone coordinate system 40 and the one or more beamlet coordinate systems 42 during runtime using a real-time calibration process.

The mapping may take any of various forms, such as a table or a mathematical relationship expressed in one or more translational functions. In some embodiments, the mapping may be based on registration of reference indicia (e.g., points, lines, shapes) defined in the viewing zone coordinate system 40 and in the one or more beamlet coordinate systems 42. For example, a first camera attached to the one or more MV pixels 12 is used to capture images of a viewing area 23 of the MV pixels 12. A registration device (not shown) including a second camera and a light source (e.g., an LED) is placed in the viewing area, and the light source is flashed, which is captured by the first camera of the MV pixels 12. The location of the flashing light in the viewing area as imaged by the first camera may serve as a reference in the viewing zone coordinate system 40 (which may be based on the coordinate system of the first camera). Encoding patterns (e.g., Gray-code patterns, non-return-to-zero (NRZ) digital sequences, amplitude-shift-keyed (ASK) bits, maximum-length sequences, shift-register sequences) are flashed on the one or more MV pixels (by selectively turning on and off the beamlets on each MV pixel) to uniquely encode every beamlet emitted from each MV pixel. The beamlet from each MV pixel that is captured by the second camera of the registration device placed in the viewing area may be identified (because each beamlet is uniquely encoded) and used as a reference in the beamlet coordinate system 42. The same process may be repeated with the registration device moved to different positions in the viewing area, to thereby obtain a set of references in the viewing zone coordinate system 40 and a set of references in the beamlet coordinate system 42. The mapping that translates between the two coordinate systems 40 and 42 may be found so as to register, align or otherwise correlate these two sets of references in the two coordinate systems. Any other registration techniques in image processing, such as automatic 3D point cloud registration, may also be used to perform the registration.

Figure 9A:
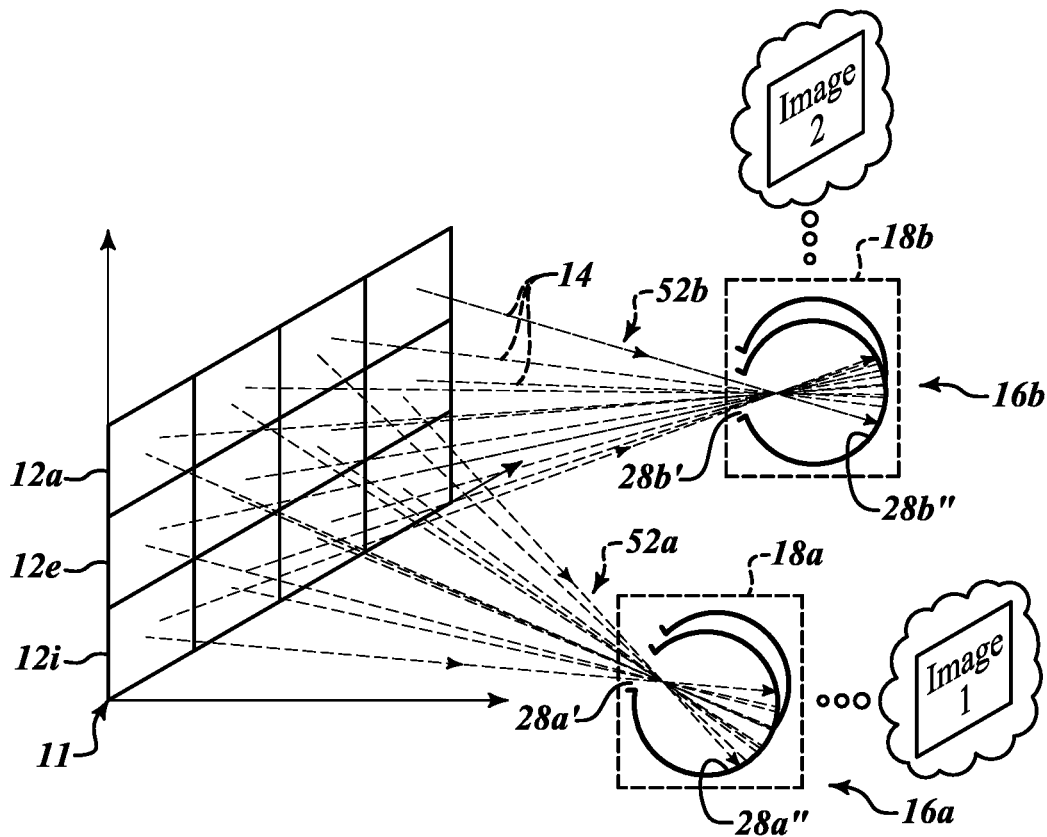
FIG. 9A depicts a sample process of using a mapping, which translates between the viewing zone coordinate system and the beamlet coordinate system, to identify a bundle of beamlets from the one or more MV pixels directed to each of the multiple viewing zones to form a corresponding image.

As illustrated in FIG. 9A, for each of multiple images ("IMAGE 1" and "IMAGE 2") generated from the multiple contents, the processor 20a, using (applying) the mapping determined (e.g., identified, accessed, generated) above, identifies a bundle of beamlets 14 from each of the MV pixels 12a-12l directed to one viewing zone 18 to form the image. As illustrated, each bundle 52a or 52b includes the beamlets 14 that are "hitting" the pupil 28a' or 28b' and spread to the retina 28a" or 28b" of the traveler 16a or 16b (each illustrated to have two eyes) to form "IMAGE 1" or "IMAGE 2" in each traveler's brain. The bundle 52a of beamlets 14 directed to the pupil 28a' in one viewing zone 18a to form one image "IMAGE 1" in the traveler 16a's brain is different from the bundle 52b of beamlets 14 directed to the pupil 28b' in another viewing zone 18b to form another image "IMAGE 2" in the traveler 16b's brain. As shown in FIG. 3, the processor 20a outputs control signaling 54 for the MV pixels 12a-12l. The control signaling 54 defines color and brightness (and any other imaging parameters as desired) of each of the beamlets 14 in each bundle 52 to project the corresponding image to the corresponding viewing zone 18. The MV pixels 12a-12l, in response to the control signaling 54 from the processor 50, project the multiple images to the multiple viewing zones, respectively.

Figure 9B:
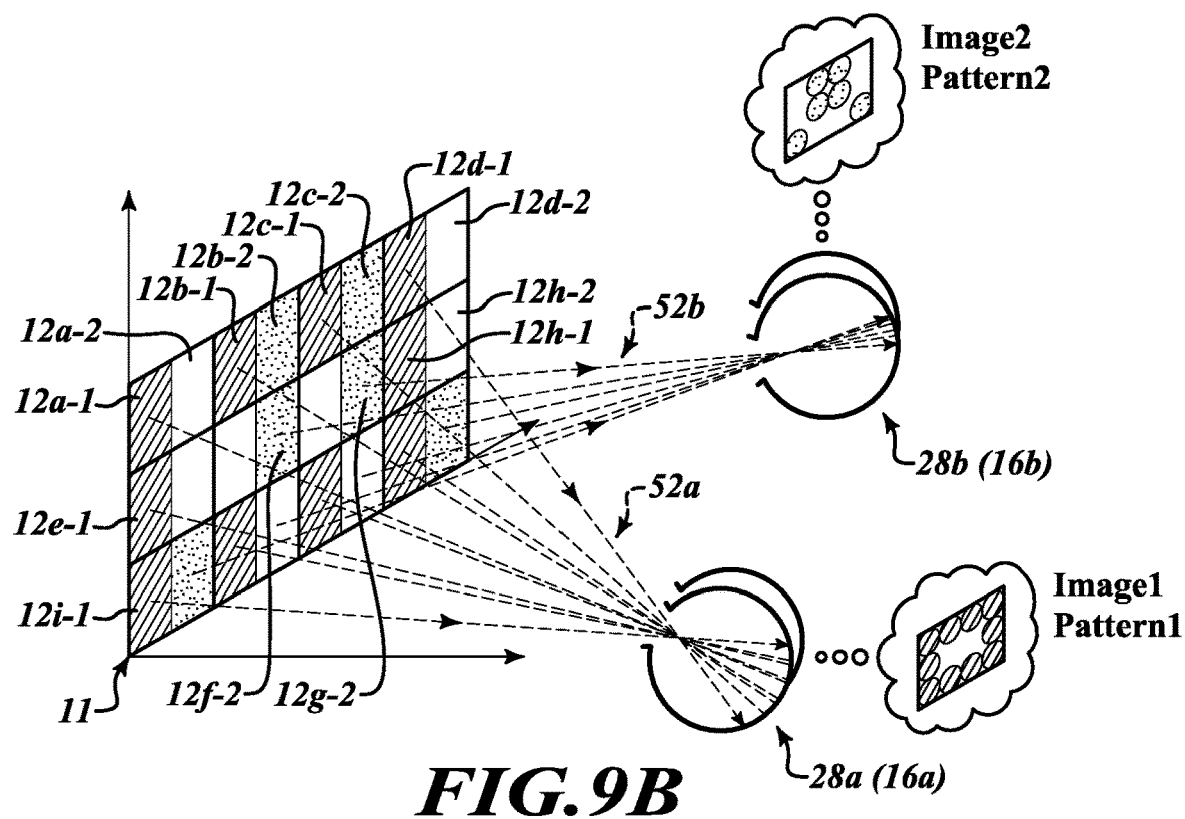
FIG. 9B depicts an example in which the MV pixels project different bundles of beamlets to different viewing zones, respectively, to present different images (IMAGE 1 and IMAGE 2 having different patterns) to the eyes located at the viewing zones.
Figure 9C:
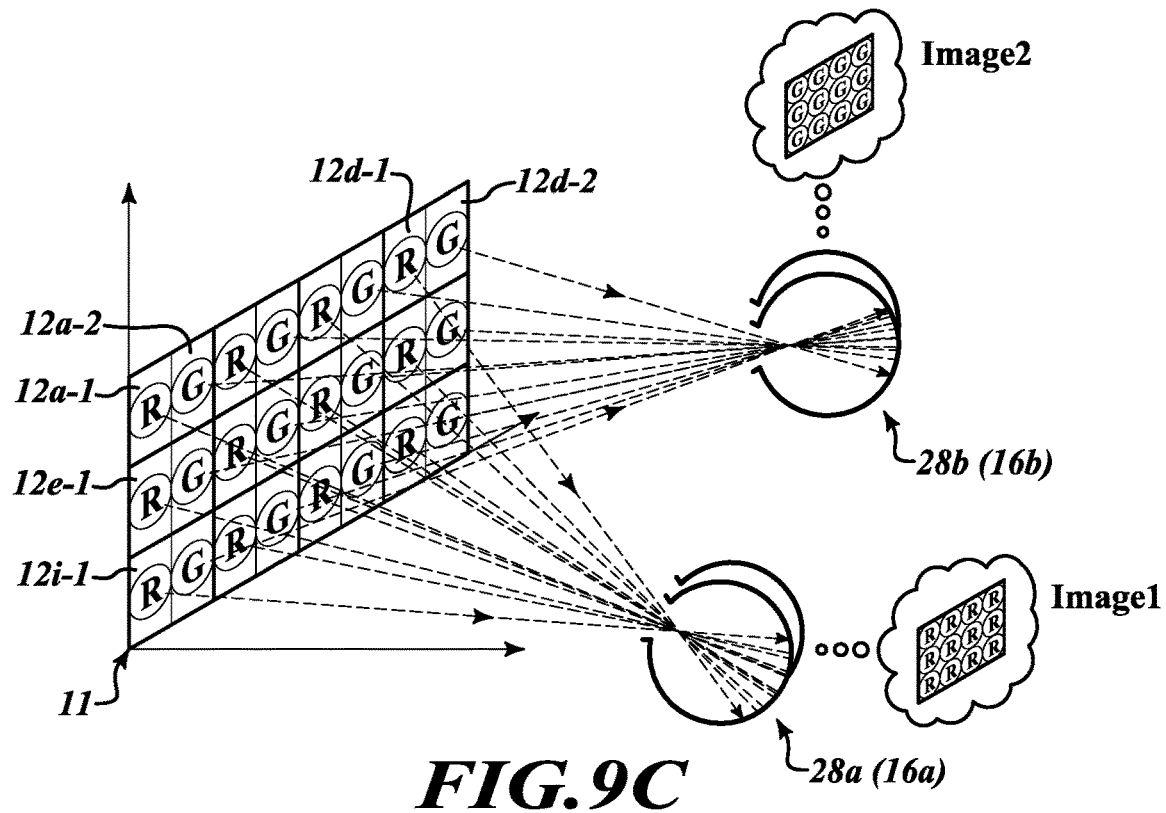
FIG. 9C depicts another example in which the MV pixels project different bundles of beamlets to different viewing zones, respectively, to present different images (IMAGE 1 and IMAGE 2 having different colors) to the eyes located at the viewing zones.

FIGS. 9B and 9C depict examples in which the MV pixels 12a-12l function to form two different images for two different travelers located at two viewing zones. In FIGS. 9B and 9C, each MV pixel is divided into two sections (e.g., 12a-1 & 12a 2), and it is assumed that the first sections (12a-1, 12b-1, 12c-1, et seq.) emit beamlets directed to the first viewing zone where the first traveler 16a (more specifically, the first traveler's eye 28a) is located, while the second sections (12a-2, 12b-2, 12c-2, et seq.) emit beamlets directed to the second viewing zone where the second traveler 16b (or the second traveler's eye 28b) is located. The control signaling 54 defines color and brightness of each of the beamlets 14 in each bundle to project the corresponding image to the corresponding viewing zone.

In FIG. 9B, the first sections of ten (10) MV pixels that form a rectangular pattern (12a-12d, 12e, 12h, and 12i-12l) emit beamlets having the color and brightness represented by "hatching" to the eye of the first traveler 16a such that the first traveler 16a sees IMAGE 1 having Pattern 1. The second sections of six (6) MV pixels (12b-12c, 12f-12g, 12i and 12l) emit beamlets having the color and brightness represented by "blotching" to the second traveler 16b such that the second traveler 16b sees IMAGE 2 having Pattern 2 that is different from Pattern 1 of IMAGE 1.

In FIG. 9C, the first sections of all twelve (12) MV pixels (12a-12l) emit beamlets having the color and brightness represented by "R" to the eye of the first traveler 16a such that the first traveler 16a sees IMAGE 1 in red. The second sections of all twelve (12) MV pixels (12a-12l) emit beamlets having the color and brightness represented by "G" to the second traveler 16b such that the second traveler 16b sees IMAGE 2 in green.

In each of these examples, a bundle of beamlets 14 that will "hit" one viewing zone is identified, and the color and brightness of each of the beamlets in the bundle are set, by the control signaling 54, to correspond to the content associated with the viewing zone so as to form an image based on the content at the viewing zone.

As used herein, "image" means anything that results from a pattern of illumination from the one or more MV pixels 12. The pattern of illumination is generated by turning "on" or "off" each of the beamlets emitted from each MV pixel 12 and/or controlling color and brightness (intensity) of each of the beamlets. Non-limiting examples of an image include any one or a combination of a static image, a stream of images (e.g., video), a text pattern (e.g., messages, signage), a lighting pattern (e.g., beamlets individually or collectively blinked, flashed, e.g., at different or varying speeds, at different brightness/dimness levels, at different brightness/dimness increase or decrease rates, etc., or otherwise turned "on" and "off"), and any other expression of content that is visible to human eyes.

An MV display 11 may consist of a single pixel, or an array of pixels arranged in a traditional display format, or a collection of irregularly placed pixels which, for example, may follow the contours of internal structures of the transportation hub.

Each MV pixel 12 may be able to simultaneously project light rays of various colors and brightness. Similarly, each MV pixel may simultaneously direct light in some directions, and show no light at all in other directions. The MV pixels may resemble small projectors, or consist of lenses over a display panel, or consist of any of a variety of technologies able to achieve the desired effect of simultaneously sending different visual information in different directions from the same MV pixel or array of MV pixels, as described in the co-assigned U.S. Pat. No. 10,269,279 titled "DISPLAY SYSTEM AND METHOD FOR DELIVERING MULTI-VIEW CONTENT" incorporated herein. In this manner, the color and brightness of each pixel, or the use of light or no-light, or other characteristics such as blinking, or fading and intensifying, or alternating between colors, may depend on the location of the traveler relative to the MV pixel. If an MV pixel is projecting the color red to the right, and the color green to the left, travelers simultaneously observing the same MV pixel will each see a different color depending on which side of the MV pixel they are standing. Likewise, an MV pixel may shine light in one direction but not another, so a person standing in one place sees a light, while a person in another place sees dark. Further, an MV pixel may appear to blink, or fade and intensify in brightness, or alternate between colors, at different rates when viewed from one location versus another location.

In some embodiments, the control signaling 54 may define, in addition to color and brightness, other parameters of each of the beamlets 14 from each MV pixel 12, such as spectral composition, polarization, beamlet shape, beamlet profile, focus, spatial coherence, temporal coherence, and overlap with other beamlets. Specifically, beamlets generally do not have a sharp edge and thus adjacent beamlets may somewhat overlap. The degree of overlap may be controlled by one of the beamlet parameters.

The control signaling 54 for the MV pixels 12 may be output from the processor 20*a* via any suitable medium including wireline and/or wireless medium, and via any suitable protocol (e.g., Bluetooth, Wi-Fi, cellular, optical, ultrasound).

FIG. 4 illustrates details of the processor 20*a* of the MV transportation hub information system 10 according to one embodiment. Various components 32, 34, 36 and 38 in the processor 20*a* of FIG. 4 may be realized by hardware, software, or a combination of hardware and software, and each component may be partly or entirely realized by circuitry, a general-purpose processor or a special-purpose processor executing a software algorithm.

The processor 20*a* receives the first attribute of the first traveler 16*a* and the second attribute of the second traveler 16*b* via the input node 9.

In the processor 20*a*, a viewing zones processor 32 is responsible for processing the first and second attributes to define the first and second viewing zones 18*a* and 18*b*. In some embodiments, the first and second attributes received via the input node 9 may be specification of the first and second viewing zones 18*a* and 18*b* as explicitly defined in the viewing zone coordinate system 40 on the UI device 19 by an operator. In other embodiments, the first and second attributes received via the input node 9 may be the locations of multiple travelers 16*a* and 16*b* as identified by the sensor 13. In these embodiments, the viewing zones processor 32 receives the identified locations of multiple travelers, and performs processing necessary to define the multiple viewing zones 18 based on the identified locations, such as by defining a point, a 2D shape, or a 3D shape that corresponds to each of the identified locations. The viewing zones processor 32 may use any of a number of image-processing techniques to process (e.g., recognize) the locations of multiple travelers (perhaps associated with surrogate devices 29) as identified by the sensor 13, such as stitching/registration, morphological filtering, thresholding, pixel counting, image segmentation, face detection, edge detection, and blob discovery and manipulation.

In various embodiments, the multiple viewing zones defined by the viewing zones processor 32 may be stored in the memory 35 to be accessible by various components of the processor 20*a*.

The zones-and-contents association module 36 running an association application associates multiple travel related contents with the multiple viewing zones 18, respectively, based at least on the multiple attributes received via the input node 9 and additionally and optionally on further attributes and data accessible by the zones-and-contents association module 36. The memory 35 may store the multiple travel related contents and/or content descriptors of the multiple travel related contents, or may store interfaces that feed to travel related content providers, or may store computer-executable algorithms, which the processor 20*a* may use to generate (create) the travel related contents to be associated with the multiple viewing zones 18.

The association program running on the zones-and-contents association module 36 is responsible for fetching, accessing, or creating multiple travel related contents for multiple viewing zones, respectively, based at least on the multiple attributes. The association program may refer to defined association rules to associate the multiple viewing zones 18 with multiple travel related contents. For example, travel related contents may be associated with the locations of the viewing zones relative to the MV display 11, so as to generate travel related images that are particularly selected as appropriate for display at those locations. As another example, travel related contents are associated with the travelers at the viewing zones, so as to generate travel related images that are particularly selected as appropriate for those travelers.

The attributes that may be used to select and associate travel related contents with viewing zones, respectively, may include, as non-limiting examples, the presence of the traveler, a location of the traveler, a characteristic of the location of the traveler (e.g., distance from the MV display), externally-observable characteristics of the traveler (e.g., based on facial recognition), an externally-observable behavior of the traveler, a path of travel followed by the traveler, a speed of the traveler, biometric information of the traveler (e.g., temperature, heart rate, eye-tracking of the viewer), demographic information of the traveler, preferences of the traveler (e.g., as explicitly inputted by the traveler using the surrogate device 29 or the UI device 19, or implicitly inferred based on the traveler's travel history), identity of the traveler, information inputted by the traveler (e.g., via the surrogate device 29 or the UI device 19), a location of the viewing zone, an environmental condition of the viewing zone (e.g., temperature), and a characteristic of the viewing zone (e.g., a spatial condition relative to surrounding structures).

As one example, attributes usable for disease control and prevention may be collected and processed by the MV transportation hub information system 10 to generate and project appropriate messaging to each traveler to promote safer and healthier travel conditions. For example, biometric information of the travelers (e.g., temperature, heart rate, etc.) may be collected as attributes to detect symptoms or signs of distress or illness, to thereby identify travelers who may be ill. As another example, various traveler attributes may be collected to detect whether the travelers are wearing face masks, maintaining social distancing, following other safety protocols, and so forth.

The attributes of multiple travelers may be stored in one or more memory devices, which the processor 20*a* may access in order to associate multiple travel related contents with the multiple viewing zones. The attributes that may be stored include, as non-limiting examples, the location of the traveler, a characteristic of the location of the traveler, externally-observable characteristics of the traveler, an externally-observable behavior of the traveler, a path of travel followed by the traveler, a speed of the traveler, biometric information of the traveler, demographic information of the traveler, preferences of the traveler, identity of the traveler, information inputted by the traveler, travel history of the traveler, a location of the viewing zone, a spatial or environmental condition of the viewing zone, and a characteristic of the viewing zone.

In some embodiments, the zones-and-contents association module 36 may refer to an "external" attribute, which impacts the association of both the first and second travel related contents with the first and second viewing zones substantially equally. For example, an external attribute indicative of a crowd size/flow (e.g., a congested state in the transportation hub) may impact the association process to assign the travel related contents to multiple viewing zones so as to disperse the travelers in the transportation hub. As another example, an external attribute indicative of timing (e.g., close to the transportation hub closing time) may impact the association process to add a special message to all travelers to leave the transportation hub soon. As yet another example, an external attribute indicative of an MV display environment (e.g., temperature rise) may impact the association process to address the environmental condition (e.g., to promote purchase of cold drinks).

The machine learning system 20*d* of the controller processor 20*a*, described above, may be used to allow for automated improvements and enhancements in the capability to associate optimal travel related contents with different viewing zone and, hence, the capability to select, customize or design optimal travel contents for different travelers. The system controller processor 20*a* performs collecting, analyzing, and applying sensor data from the sensing system 24 to refine the first and second travel related contents to be presented to the first and second travelers 16*a* and 16*b* at the first and second viewing zones 18*a* and 18*b*.

If the beamlet resolution of MV pixels 12 in a MV display 11 is low, then it may be possible for a viewer to see another viewer's content if they are near each other or at substantially the same viewing angle (such that their viewing zones may overlap). In some embodiments, the system controller 20 may detect that the first image provided to the first traveler 16*a* at the first viewing zone 18*a* may be visible to the second traveler 16*b* who, as detected by the sensing system 24, may come closer to where the first traveler 16*a* is present. In these situations, it may be desirable for the MV display to show the same shared content to the two viewers, to avoid interference. For example, if two viewers get close enough, the system can show generic airport information. Alternatively, the MV display 11 can show instructional content for the two viewers to move apart so as to separate out their viewing zones to which individualized content is directed, respectively. As another example, if the two viewers share the same language preferences, the MV display can show generic content in that shared language.

In some embodiments, multiple travel related contents to be associated with the multiple viewing zones 18 based on the first and second attributes, and optionally and additionally on external attributes, may be generated in real time by the zones-and-contents association module 36. For example, the association application running on the zones-and-contents association module 36 may generate travel related content (e.g., signage, a lighting pattern) in real time for each viewing zone as a function of the attributes using a suitable association algorithm.

The mapping engine 34 of the processor 20*a* determines (e.g., identifies, accesses, generates) a mapping that translates between the viewing zone coordinate system 40 and the one or more beamlet coordinate systems 42. In various embodiments, the mapping may be stored (or pre-stored) in the memory 35, in which case the processor 20*a* accesses the stored mapping.

Multiple mappings (e.g., one that translates from the viewing zone coordinate system 40 to the one or more beamlet coordinate systems 42, and another that translates from the one or more beamlet coordinate systems 42 to the viewing zone coordinate system 40) may be stored in the memory 35, and the mapping engine 34 may selectively access one or more suitable mapping(s) therefrom. In various embodiments, the mapping engine 34 determines (e.g., accesses) the mapping(s), and a beamlet-bundles identification module 38, to be described below, applies the mapping (s) to identify the bundle of beamlets that hit each viewing zone.

For each of multiple images generated from the multiple travel related contents (associated with the multiple viewing zones by the zones-and-content association module 36), using the mapping (determined/identified/accessed/generated by the mapping engine 34), the processor 20*a* identifies a bundle of beamlets from each of the MV pixels directed to one viewing zone to form the image. In the processor 20*a*, a beamlet-bundles identification module 38 running a bundle identification application is responsible for applying the mapping to identify the multiple bundles 52*a*, 52*b* of beamlets directed to the multiple viewing zones 18*a*, 18*b* to form the multiple images, respectively (see the examples of FIGS. 9A, 9B and 9C, described above). Generally, the bundle identification application, for each of the images, identifies a bundle of beamlets that "hit" or "land" on/in the corresponding viewing zone to form the image.

Referring back to FIGS. 1A and 1B, in some embodiments, the first and second travel related contents may be updated to generate an updated version of the first image 25*a* visible to the first traveler 16*a*, and likewise the second travel related content associated with the second viewing zone 18*b* may be updated to generate an updated version of the second image 25*b* visible to the second traveler 16*b*. For example, in FIG. 1A, the sensing system 24 may sense that the first traveler 16*a* is moving from a first position to a second position relative to the MV display 11. Then the system controller processor 20*a* controls the MV display 11 to project the updated version of the first image 25*a* to the first viewing zone 18*a* at the second position, after projecting the original first image 25*a* to the first viewing zone 18*a* at the second position. Alternatively, when the sensing system 24 detects a new state of the first traveler 16*a* (e.g., the first traveler requesting certain information using their surrogate device), the MV display 11 may be controlled to project an updated version of the first image 25*a* to the first viewing zone 18*a* responsive to the first traveler's request. Thus, the MV display 11 is capable of projecting changing images to each of the first traveler 16*a* and the second traveler 16*b* in addition to being capable of projecting different images to the first and second travelers 16*a* and 16*b*, respectively.

An individual who continuously looks at an MV display 12 while wandering through its various viewing zones will see a new (different) content whenever crossing into a new viewing zone. The content shown in each viewing zone can be customized—even to the point of continually reconfiguring the viewing zones, and continually reassigning the content. This means a viewing zone may be constantly adjusted so it follows an individual walking past an MV display, allowing that individual to see content intended for them when crossing the paths of other people looking at the same time at the same MV display. Meanwhile, these other people may be watching their own customized content.

FIG. 1B illustrates some implementation examples of the MV transportation hub information system 10 to guide or direct multiple travelers 16a-16c (three travelers ①②③ are shown). Due to the nature of MV displays, different travel related contents can be simultaneously displayed at different viewing zones for the different travelers by the same MV display.

In the example of FIG. 1B, the system controller processor 20a receives, via the sensors 13a-13c, the first blob 17a at "Location 1" where the first MV display 11a ("MV display 1") is located. The system controller processor 20a also receives, via the input node 9, the first attribute of the first traveler 16a. The first attribute may be, for example, the identity of the first traveler 16a who scans in their boarding pass 21a at a check in kiosk at "Location 1". Similarly, the controller processor 20a receives the second blob 17b at "Location 1" and also receives the second attribute of the second traveler 16b. The second attribute may be, for example, the identity of the second traveler 16b who scans in their boarding pass 21b at the check in kiosk at "Location 1." The processor 20a then performs user tagging to tag the first blob 17a with the first traveler 16a and tag the second blob 17b with the second traveler 16b. The processor 20a defines the first and second viewing zones 18a and 18b based on the first and second blobs 17a and 17b, relative to the first display 11a ("MV Display 1"), and associates (e.g., retrieves, feeds into, or generates) first and second travel related contents with the first and second viewing zones 18a and 18b based at least on the first and second attributes. For example, the first and second travel related contents may be selected to generate first and second images 25a and 25b which are designed to assist the first and second travelers 16a and 16b on different travel itineraries simultaneously. In the illustrated example, the first image 25a reads "Traveler 1! Go to Gate 2 for your Flight X2 departing at YY:22. You are on a waiting list for Flight X3," which prompts the first traveler 16a to go to Gate 2 ("Location 2") where the second display 11b ("MV display 2") is located. On the other hand, the second image 25b for the second traveler 16b reads "Traveler 2! Go to Gate 3 for your Flight X3 departing at YY:33," which prompts the second traveler 16b to go to Gate 3 ("Location 3") where the third display 11c ("MV display 3") is located.

The first traveler 16a, upon viewing the first image 25a, moves to Gate 2 at Location 2 where the second MV display 11b is located. The system controller processor 20a may track movement of the first traveler 16a and receive an attribute of the first traveler 16a, such as the identity of the first traveler 16a now standing at a third viewing zone 18c relative to the second MV display 11b, and associates a third travel related content with the third viewing zone 18c based at least on this attribute. In various embodiments, in addition to this attribute (the identity of the first traveler 16a), the processor 20a may consider further attributes of the first traveler 16a or of the third viewing zone 18c as sensed by the sensing system 24, as inputted by the first traveler 16a, or as retrieved from one or more storage devices accessible by the processor 20a (e.g., the first traveler's travel history, travel preferences, etc.) to further refine the third travel related content associated with the third viewing zone 18c. In the illustrated example, further attributes indicate that the first traveler 16a was on a waiting list for Flight X3 but is now cleared to board Flight X3.

Then, the third image 25c based on the third travel related content could read "Traveler 1! You may board Flight X3. Go to Gate 3," to prompt the first traveler 16a to move to Gate 3 ("Location 3") where the third MV display 11c ("MV display 3") is located. The system controller processor 20a, based on one or more attributes of the first traveler 16a or of a fourth viewing zone 18d where the first traveler 16a is at, controls the third MV display 11c to project a fourth image 25d generated from the fourth travel related content relevant to the first traveler 16a. In the illustrated example, the fourth image 25d that the third MV display 11c shows to the fourth viewing zone 18d of the first traveler 16a (as sensed at the third location by the sensor 13c) reads "Traveler 1! Check in with the gate agent to get a boarding pass for Flight X3."

Still referring to FIG. 1B, the system controller processor 20a controls the MV displays 11a-11c to guide the second traveler 16b at the same time as it is guiding the first traveler 16a. For example, while the first MV display 11a is showing the first image 25a to direct the first traveler 16a to move from Location 1 (e.g., airport check in counter) to Location 2 ("Gate 2"), the same first MV display 11a is showing the second image 25b to the second traveler 16b to direct him to move from Location 1 to Location 3 (Gate 3). The second traveler 16b thus moves to Location 3 where the third MV display 11c is located. The system controller processor 20a, based on one or more attributes of the second traveler 16b or of a fifth viewing zone 18e where the second traveler 16b is standing as sensed by the sensor 13c, controls the third MV display 11c to project a fifth image 25e generated from the fifth travel related content relevant to the second traveler 16b. In the illustrated example, the fifth image 25e that the third MV display 11c shows to the second traveler 16b at the fifth viewing zone 18e reads "Traveler 2! Your Flight X3 is on schedule to depart at YY:33".

While in the illustrated embodiment of FIG. 1B the first and second travelers 16a and 16b who both start at the first MV display 11a are directed to the second and third MV displays 11b and 11c at the second and third locations that are different from each other, in some embodiments the second and third MV displays 11b and 11c may be the same display at the same location. In such embodiments, the first and second travelers 16a and 16b follow the same physical path from the first MV display 11a to the next MV display (11b/11c), while viewing different images at the first MV display 11a and viewing different images at the next MV display (11b/11c) to receive different (e.g., personalized) travel related content or messages.

Still referring to FIG. 1B, the system controller processor 20a may control the MV displays 11a-11c to also guide or support the third traveler 16c simultaneously, who starts at the second display 11b ("MV display 2") at Location 2. The system controller processor 20a receives, via the sensors 13a-13c, a third blob 17f, and receives, via the input node, an attribute of the third traveler 16c, and performs user tagging to tag the third blob 17f with the third traveler 16c. The system controller processor 20a associates the sixth travel related content with the sixth viewing zone 18f based at least on the attribute and optionally additionally on further attributes of the third traveler 16c or of the sixth viewing zone 18f. The third MV display 11c projects a sixth image 25f, which reads "Traveler 3! Your flight X2 is on schedule to depart at YY:22." The third MV display 11c shows the sixth image 25f to the third traveler 16c at the same time as it is showing the third image 25c to the first traveler 16a.

Figure 10:
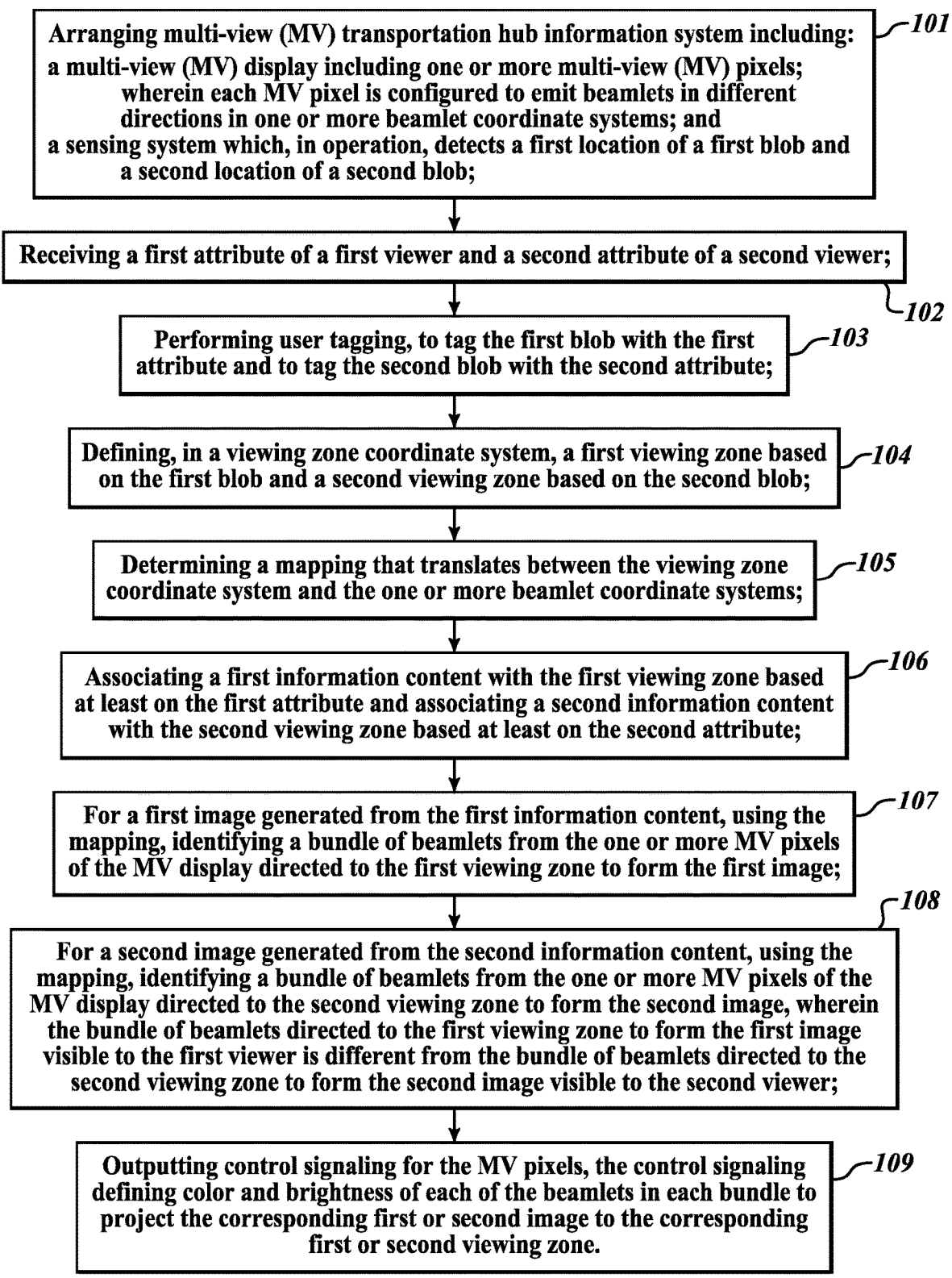
FIG. 10 is a flowchart depicting a method of delivering personalized content to multiple travelers in a transportation hub according to one embodiment.

FIG. 10 is a flowchart depicting a method of delivering personalized content to multiple travelers in a transportation hub according to one embodiment.

In step 101, an MV transportation hub information system 10 as described above is arranged, which includes: a multi-view (MV) display 11 including one or more MV pixels 12, wherein each MV pixel 12 is configured to emit beamlets 14 in different directions in one or more beamlet coordinate systems 42. The MV transportation hub information system 10 also includes a sensing system 24 which, in operation, detects a first location of a first blob 17a and a second location of a second blob 17b. The method is performed by the system 10.

In step 102, the system 10 receives a first attribute of a first viewer 16a and a second attribute of a second viewer 16b.

In step 103, the system 10 performs user tagging to tag the first blob with the first attribute of the first viewer and to tag the second blob with the second attribute of the second viewer (i.e., tagging the first blob 17a with the first viewer 16a and tagging the second blob 17b with the second viewer 16b).

In step 104, the system 10 defines, in a viewing zone coordinate system, a first viewing zone 18a based on the first blob 17a and a second viewing zone 18b based on the second blob 17b.

In step 105, the system 10 determines a mapping that translates between the viewing zone coordinate system and the one or more beamlet coordinate systems.

In step 106, the system 10 associates a first information content with the first viewing zone 18a based at least on the first attribute, and associates a second information content with the second viewing zone 18b based at least on the second attribute.

In step 107, for a first image generated from the first information content, using the mapping, the system 10 identifies a bundle of beamlets from the one or more MV pixels of the MV display directed to the first viewing zone to form the first image.

In step 108, for a second image generated from the second information content, using the mapping, the system 10 identifies a bundle of beamlets from the one or more MV pixels of the MV display directed to the second viewing zone to form the second image, wherein the bundle of beamlets directed to the first viewing zone to form the first image visible to the first viewer is different from the bundle of beamlets directed to the second viewing zone to form the second image visible to the second viewer.

In step 109, the system 10 outputs control signaling for the MV pixels, wherein the control signaling defines color and brightness of each of the beamlets in each bundle to project the corresponding first or second image to the corresponding first or second viewing zone.

While various exemplary embodiments of the invention have been described above as suited for implementation in transportation hubs, it should be understood that the techniques disclosed here apply to situations outside of transportation hubs, such as in the fields of retail, dining, entertainment, sports, conventions, corporate offices, museums, and residential to name a few.

DEFINITIONS

As used herein, the term "display" may describe: a single display, multiple displays, an array of displays, arrangements of displays, or a single projection source (pixel). Displays might also take the form of scattered pixels, or laid out in strips, or patterns, or as star fields, or arbitrarily, or in dynamic, moveable arrays—without limitation. In this disclosure, the term display is used interchangeably with such terms as sign, signage, signal, and light, and may also refer to the use of multiple displays in the various configurations described above.

The term "content" describes what is seen (or not seen) on the display.

The phrase "viewing area" describes the total area from which an MV display may be seen. If an individual is able to see the display, they are in its viewing area. The viewing area may include locations at angles or distances from which content on the display may only be seen with difficulty, as well as locations from which content on the display may be partially blocked.

The phrase "viewing zone" is used to describe a non-overlapping subset within the viewing area; a subset from which one distinct version of content may be seen. A viewing zone is a smaller portion of the total region in sight of the display. The viewing area for the display will typically be divided into multiple viewing zones, none of them overlapping, and each assigned a distinct (e.g., different) version of content. In simple cases, a viewing zone might be created within the viewing area, and only individuals within that specific zone can see content when looking at the display. The region outside this zone will constitute a second viewing zone, from which the version of content seen on the display will be no content—the display will appear to be blank, or turned off. In some cases, a viewing zone may include all the locations from which a display may be seen, in which case it coincides with the viewing area. Typically, any individual looking at the display from a specific viewing zone will see the content that has been assigned to that zone, and will not be able to see the content being simultaneously shown to other viewing zones.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A multi-view (MV) transportation hub information system comprising:
   a multi-view (MV) display including one or more multi-view (MV) pixels, wherein each MV pixel is configured to emit beamlets in different directions in one or more beamlet coordinate systems;
   a sensing system which defines a registration region and which, in operation, detects, within the registration region, a first location of a first blob whose identity is unknown and a second location of a second blob whose identity is unknown;
   an input node which, in operation, receives a first attribute of a first viewer and a second attribute of a second viewer; and
   a system controller, coupled to the MV display, the sensing system, and the input node, which, in operation,
   performs user tagging to tag the first blob in the registration region with the first attribute to thereby identify the first blob as the first viewer, and to tag the second blob in the registration region with the second attribute to thereby identify the second blob as the second viewer, and to track movement of the identified first blob from the registration region, and to track movement of the identified second blob from the registration region;

defines, in a viewing zone coordinate system, a first viewing zone based on the first blob and a second viewing zone based on the second blob;

determines a mapping that translates between the viewing zone coordinate system and the one or more beamlet coordinate systems;

associates a first information content with the first viewing zone based at least on the first attribute and associates a second information content with the second viewing zone based at least on the second attribute;

for a first image generated from the first information content, using the mapping, identifies a bundle of beamlets from the one or more MV pixels of the MV display directed to the first viewing zone to form the first image;

for a second image generated from the second information content, using the mapping, identifies a bundle of beamlets from the one or more MV pixels of the MV display directed to the second viewing zone to form the second image, wherein the bundle of beamlets directed to the first viewing zone to form the first image visible to the first viewer is different from the bundle of beamlets directed to the second viewing zone to form the second image visible to the second viewer; and outputs control signaling for the MV pixels, the control signaling defining color and brightness of each of the beamlets in each bundle to project the corresponding first or second image to the corresponding first or second viewing zone.

2. The MV transportation hub information system of claim 1, wherein the sensing system comprises a camera.

3. The MV transportation hub information system of claim 1, wherein the first or second information content includes one or more of: transportation information, gate location, wayfinding direction, boarding time, travel update notification, advertisement, arrival message, departure message, baggage claim information, language translation, accessibility information, personal messaging from individuals, location of services, emergency/evacuation notifications, brand messaging, entertainment content, group coordination information, graphical/pictorial/photographic content, video content, and image capture.

4. The MV transportation hub information system of claim 1, comprising a ticket scanner which, in operation, detects the first attribute.

5. The MV transportation hub information system of claim 1, comprising a stationary kiosk, wherein the registration region is defined adjacent to the stationary kiosk, to facilitate identification of the first or second blob located in the registration region as the first or second viewer inputting the first or second attribute to the stationary kiosk.

6. The MV transportation hub information system of claim 1, comprising a biometric scanner which, in operation, detects the first attribute.

7. The MV transportation hub information system of claim 6, wherein the biometric scanner comprises a facial recognition system, a fingerprint scanner, a retinal scanner, or an iris recognition system.

8. The MV transportation hub information system of claim 1, wherein the system controller detects that the first image may be visible to the second viewer.

9. The MV transportation hub information system of claim 8, wherein the system controller associates a third information content with both the first viewer and the second viewer.

10. The MV transportation hub information system of claim 9, wherein the third information content compromises one or more of: a generic content, instructional content, or content in a shared language.

11. A multi-view (MV) transportation hub information system, comprising:

a multi-view (MV) display including one or more multi-view (MV) pixels, wherein each MV pixel is configured to emit beamlets in different directions in one or more beamlet coordinate systems;

a sensing system which, in operation, detects a first location of a first blob whose identity is unknown and a second location of a second blob whose identity is unknown;

an input node which, in operation, receives a first attribute of a first viewer via a first traveler surrogate device of the first viewer, and a second attribute of a second viewer via a second traveler surrogate device of the second viewer, wherein the first or second traveler surrogate device comprises a smartphone or a mobile computing device of the first or second viewer, respectively; and a system controller, coupled to the MV display, the sensing system, and the input node, which, in operation, performs user tagging to tag the first blob with the first attribute to thereby identify the first blob as the first viewer, and to tag the second blob with the second attribute to thereby identify the second blob as the second viewer, and to track movement of the identified first blob, and to track movement of the identified second blob;

defines, in a viewing zone coordinate system, a first viewing zone based on the first blob and a second viewing zone based on the second blob;

determines a mapping that translates between the viewing zone coordinate system and the one or more beamlet coordinate systems;

associates a first information content with the first viewing zone based at least on the first attribute and associates a second information content with the second viewing zone based at least on the second attribute;

for a first image generated from the first information content, using the mapping, identifies a bundle of beamlets from the one or more MV pixels of the MV display directed to the first viewing zone to form the first image;

for a second image generated from the second information content, using the mapping, identifies a bundle of beamlets from the one or more MV pixels of the MV display directed to the second viewing zone to form the second image, wherein the bundle of beamlets directed to the first viewing zone to form the first image visible to the first viewer is different from the bundle of beamlets directed to the second viewing zone to form the second image visible to the second viewer; and outputs control signaling for the MV pixels, the control signaling defining color and brightness of each of the beamlets in each bundle to project the corresponding first or second image to the corresponding first or second viewing zone.

12. The MV transportation hub information system of claim 11, wherein a location of the first or second traveler surrogate device is estimated using a localization system in a device coordinate system.

13. The MV transportation hub information system of claim 12, wherein the system controller determines a mapping between the device coordinate system and one or more of the viewing zone coordinate system or the beamlet coordinate systems.

14. The MV transportation hub information system of claim 12, wherein the user tagging is performed by associating the first or second traveler surrogate device with the first or second blob, respectively, using the location of the first or second traveler surrogate device and the location of the first or second blob, by one or more of a nearest-neighbor matching technique, a dynamic time warping technique, a combinatorial optimization technique, or a classifier trained using a machine learning algorithm.

15. The MV transportation hub information system of claim 12, wherein the localization system estimates the location of the first or second traveler surrogate device using one or more of Wi-Fi triangulation, ultra-wideband triangulation, Bluetooth time-of-flight, Bluetooth signal strength, Bluetooth angle-of-arrival, or ultrasound techniques.

16. The MV transportation hub information system of claim 11, wherein the sensing system comprises a camera.

17. The MV transportation hub information system of claim 11, wherein the first or second information content includes one or more of: transportation information, gate location, wayfinding direction, boarding time, travel update notification, advertisement, arrival message, departure message, baggage claim information, language translation, accessibility information, personal messaging from individuals, location of services, emergency/evacuation notifications, brand messaging, entertainment content, group coordination information, graphical/pictorial/photographic content, video content, and image capture.

18. The MV transportation hub information system of claim 11, wherein the system controller detects that the first image may be visible to the second viewer.

19. The MV transportation hub information system of claim 18, wherein the system controller associates a third information content with both the first viewer and the second viewer.

20. The MV transportation hub information system of claim 19, wherein the third information content compromises one or more of: a generic content, instructional content, or content in a shared language.

21. A method of supporting multiple travelers navigating through a transportation hub, comprising:
arranging multi-view (MV) transportation hub information system including:
a multi-view (MV) display including one or more multi-view (MV) pixels; wherein each MV pixel is configured to emit beamlets in different directions in one or more beamlet coordinate systems; and
a sensing system which defines a registration region and which, in operation, detects, within the registration region, a first blob whose identity is unknown and a second blob whose identity is unknown;
receiving, at the MV transportation hub information system, a first attribute of a first viewer and a second attribute of a second viewer;
performing user tagging to tag the first blob in the registration region with the first attribute to thereby identify the first blob as the first viewer, and to tag the second blob in the registration region with the second attribute to thereby identify the second blob as the second viewer;
tracking movement of the identified first blob from the registration region, and tracking movement of the identified second blob from the registration region;
defining, in a viewing zone coordinate system, a first viewing zone based on the first blob and a second viewing zone based on the second blob;
determining a mapping that translates between the viewing zone coordinate system and the one or more beamlet coordinate systems;
associating a first information content with the first viewing zone based at least on the first attribute and associating a second information content with the second viewing zone based at least on the second attribute;
for a first image generated from the first information content, using the mapping, identifying a bundle of beamlets from the one or more MV pixels of the MV display directed to the first viewing zone to form the first image;
for a second image generated from the second information content, using the mapping, identifying a bundle of beamlets from the one or more MV pixels of the MV display directed to the second viewing zone to form the second image, wherein the bundle of beamlets directed to the first viewing zone to form the first image visible to the first viewer is different from the bundle of beamlets directed to the second viewing zone to form the second image visible to the second viewer; and
outputting control signaling for the MV pixels, the control signaling defining color and brightness of each of the beamlets in each bundle to project the corresponding first or second image to the corresponding first or second viewing zone.

22. A method of supporting multiple travelers navigating through a transportation hub, comprising:
arranging multi-view (MV) transportation hub information system including:
a multi-view (MV) display including one or more multi-view (MV) pixels; wherein each MV pixel is configured to emit beamlets in different directions in one or more beamlet coordinate systems; and
a sensing system which, in operation, detects a first location of a first blob whose identity is unknown and detects a second location of a second blob whose identity is unknown;
receiving, at the MV transportation hub information system, a first attribute of a first viewer via a first traveler surrogate device of the first viewer, and a second attribute of a second viewer via a second traveler surrogate device of the second viewer, wherein the first or second traveler surrogate device comprises a smartphone or a mobile computing device of the first or second viewer, respectively;
performing user tagging to tag the first blob with the first attribute to thereby identify the first blob as the first viewer, and to tag the second blob with the second attribute to thereby identify the second blob as the second viewer;
tracking movement of the identified first blob, and tracking movement of the identified second blob;

defining, in a viewing zone coordinate system, a first viewing zone based on the first blob and a second viewing zone based on the second blob;

determining a mapping that translates between the viewing zone coordinate system and the one or more beamlet coordinate systems;

associating a first information content with the first viewing zone based at least on the first attribute and associating a second information content with the second viewing zone based at least on the second attribute;

for a first image generated from the first information content, using the mapping, identifying a bundle of beamlets from the one or more MV pixels of the MV display directed to the first viewing zone to form the first image;

for a second image generated from the second information content, using the mapping, identifying a bundle of beamlets from the one or more MV pixels of the MV display directed to the second viewing zone to form the second image, wherein the bundle of beamlets directed to the first viewing zone to form the first image visible to the first viewer is different from the bundle of beamlets directed to the second viewing zone to form the second image visible to the second viewer; and outputting control signaling for the MV pixels, the control signaling defining color and brightness of each of the beamlets in each bundle to project the corresponding first or second image to the corresponding first or second viewing zone.

23. The method of claim 22, wherein the user tagging is performed by:

associating the first or second traveler surrogate device of the first or second viewer with the first or second blob, respectively, using a location of the first or second traveler surrogate device and the first or second location of the first or second blob, by one or more of a nearest-neighbor matching technique, a dynamic time warping technique, a combinatorial optimization technique, or a classifier trained using a machine learning algorithm.

* * * * *